(12) United States Patent
Shu et al.

(10) Patent No.: US 11,354,744 B2
(45) Date of Patent: Jun. 7, 2022

(54) BLOCKCHAIN-BASED CROSS-CURRENCY SETTLEMENT METHODS, APPARATUSES, AND DEVICES

(71) Applicant: ALIPAY (HANGZHOU) INFORMATION TECHNOLOGY CO., LTD., Zhejiang (CN)

(72) Inventors: Shi Shu, Hangzhou (CN); Danqing Hu, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/361,366

(22) Filed: Jun. 29, 2021

(65) Prior Publication Data

US 2022/0067831 A1 Mar. 3, 2022

(30) Foreign Application Priority Data

Aug. 28, 2020 (CN) .......................... 202010888592.0

(51) Int. Cl.
*G06Q 40/00* (2012.01)
*G06Q 40/04* (2012.01)
*G06Q 20/06* (2012.01)

(52) U.S. Cl.
CPC .......... *G06Q 40/04* (2013.01); *G06Q 20/065* (2013.01); *G06Q 2220/00* (2013.01)

(58) Field of Classification Search
None
See application file for complete search history.

(56) References Cited

U.S. PATENT DOCUMENTS 10,540,639 B2   1/2020 Brock et al.
10,878,409 B1 * 12/2020 Chheda ................ G06Q 20/065
(Continued)

FOREIGN PATENT DOCUMENTS

CN    107742210 A    2/2018
CN    108805712 A    11/2018
(Continued)

OTHER PUBLICATIONS

First Search for Chinese Application No. 202010888592.0 dated Oct. 27, 2020.

*Primary Examiner* — Olabode Akintola

(57) ABSTRACT

A blockchain-based cross-currency settlement method performed by a blockchain network is disclosed, including: adding a first blockchain asset corresponding to a first off-chain funds of a first currency to a blockchain account of a transit node in the blockchain network, wherein the first settlement node is inside a territory; adding a second blockchain asset corresponding to a second off-chain funds of a second currency to the blockchain account of the transit node in the blockchain network, wherein the second settlement node is outside the territory; in response to receiving the fund exchange transaction, transferring the first blockchain asset from a blockchain account corresponding to the transit node to a blockchain account corresponding to the second settlement node, and transferring the second blockchain asset from the blockchain account corresponding to the transit node to a blockchain account corresponding to the first settlement node to perform cross-currency fund settlement.

19 Claims, 9 Drawing Sheets

(56) References Cited

U.S. PATENT DOCUMENTS

| | | | |
|---|---|---|---|
| 2004/0236698 A1* | 11/2004 | Sweeney | G06Q 40/02 705/64 |
| 2015/0170112 A1 | 6/2015 | Decastro | |
| 2015/0348169 A1 | 12/2015 | Harris et al. | |
| 2017/0372278 A1 | 12/2017 | Frolov et al. | |
| 2018/0089760 A1 | 3/2018 | Stradling et al. | |
| 2018/0216946 A1 | 8/2018 | Gueye | |
| 2019/0057362 A1 | 2/2019 | Wright et al. | |
| 2019/0080392 A1 | 3/2019 | Youb et al. | |
| 2019/0087893 A1 | 3/2019 | Pellew | |
| 2019/0251199 A1 | 8/2019 | Klianev | |
| 2019/0370811 A1 | 12/2019 | Zhang et al. | |
| 2021/0174360 A1* | 6/2021 | Davies | G06Q 20/102 |

FOREIGN PATENT DOCUMENTS

| | | |
|---|---|---|
| CN | 109003184 A | 12/2018 |
| CN | 110706110 A | 1/2020 |
| CN | 110706114 A | 1/2020 |
| WO | 2017176093 A1 | 10/2017 |

\* cited by examiner

BLOCKCHAIN-BASED CROSS-CURRENCY SETTLEMENT METHODS, APPARATUSES, AND DEVICES

CROSS-REFERENCE TO RELATED APPLICATIONS

The present application is based on and claims priority to Chinese Application No. 202010888592.0 filed Aug. 28, 2020 and entitled "BLOCKCHAIN-BASED CROSS-CURRENCY SETTLEMENT METHODS, APPARATUSES, AND DEVICES", the entire contents of which are incorporated herein by reference.

TECHNICAL FIELD

This specification relates to the field of blockchain technologies, and in particular, to blockchain-based cross-currency settlement methods, apparatuses, and devices.

BACKGROUND

Blockchain technology, also referred to as a distributed ledger technology, is an emerging technology in which a plurality of computer devices can participate in "accounting" to jointly maintain a complete distributed database. The blockchain technology has many features, such as decentralization, openness, and transparency. It can allow each of the plurality of computer devices or nodes to participate in database recording, and perform quick data synchronization between the computer devices. The blockchain technology is widely applied to a variety of fields.

SUMMARY

Embodiments of this specification provide blockchain-based cross-currency settlement methods. An example method performed by a blockchain network comprises: in response to a determination that first off-chain funds of a first currency transferred by a first settlement node to a first settlement account are in a frozen state, adding a first blockchain asset corresponding to the first off-chain funds of the first currency to a blockchain account of a transit node in a blockchain network, wherein the first settlement node is inside a territory and the first settlement account is opened by the transit node at the first settlement node; in response to a determination that second off-chain funds of a second currency different from the first currency transferred by a second settlement node to a second settlement account are in a frozen state, adding a second blockchain asset corresponding to the second off-chain funds of the second currency to the blockchain account of the transit node in the blockchain network, wherein the second settlement node is outside the territory and the second settlement account is opened by the transit node at the second settlement node; receiving a fund exchange transaction sent by the transit node, the fund exchange transaction created by the transit node according to fund exchange instructions from the first settlement node and the second settlement node; in response to receiving the fund exchange transaction: transferring the first blockchain asset from a blockchain account corresponding to the transit node to a blockchain account corresponding to the second settlement node, and transferring the second blockchain asset from the blockchain account corresponding to the transit node to a blockchain account corresponding to the first settlement node to perform, by the first settlement node or the second settlement node, cross-currency fund settlement.

Embodiments of this specification further provide systems for blockchain-based cross-currency settlements. An example system comprises one or more processors and one or more non-transitory computer-readable memories coupled to the one or more processors and configured with instructions executable by the one or more processors to cause the system to perform operations comprising: in response to a determination that first off-chain funds of a first currency transferred by a first settlement node to a first settlement account are in a frozen state, adding a first blockchain asset corresponding to the first off-chain funds of the first currency to a blockchain account of a transit node in a blockchain network, wherein the first settlement node is inside a territory and the first settlement account is opened by the transit node at the first settlement node; in response to a determination that second off-chain funds of a second currency different from the first currency transferred by a second settlement node to a second settlement account are in a frozen state, adding a second blockchain asset corresponding to the second off-chain funds of the second currency to the blockchain account of the transit node in the blockchain network, wherein the second settlement node is outside the territory and the second settlement account is opened by the transit node at the second settlement node; receiving a fund exchange transaction sent by the transit node, the fund exchange transaction created by the transit node according to fund exchange instructions from the first settlement node and the second settlement node; in response to receiving the fund exchange transaction: transferring the first blockchain asset from a blockchain account corresponding to the transit node to a blockchain account corresponding to the second settlement node, and transferring the second blockchain asset from the blockchain account corresponding to the transit node to a blockchain account corresponding to the first settlement node to perform, by the first settlement node or the second settlement node, cross-currency fund settlement.

Embodiments of this specification further provide one or more non-transitory computer-readable storage media. Example one or more non-transitory computer-readable storage media store instructions for blockchain-based cross-currency settlements, wherein the instructions are executable by one or more processors and execution of the instructions causes the one or more processors to perform operations comprising: in response to a determination that first off-chain funds of a first currency transferred by a first settlement node to a first settlement account are in a frozen state, adding a first blockchain asset corresponding to the first off-chain funds of the first currency to a blockchain account of a transit node in a blockchain network, wherein the first settlement node is inside a territory and the first settlement account is opened by the transit node at the first settlement node; in response to a determination that second off-chain funds of a second currency different from the first currency transferred by a second settlement node to a second settlement account are in a frozen state, adding a second blockchain asset corresponding to the second off-chain funds of the second currency to the blockchain account of the transit node in the blockchain network, wherein the second settlement node is outside the territory and the second settlement account is opened by the transit node at the second settlement node; receiving a fund exchange transaction sent by the transit node, the fund exchange transaction created by the transit node according to fund exchange instructions from the first settlement node and the second settlement node; in response to receiving the fund exchange transaction: transferring the first blockchain asset from a blockchain account corresponding to the transit node to a blockchain account corresponding to the second settlement node, and transferring the second blockchain asset from the blockchain account corresponding to the transit node to a blockchain account corresponding to the first settlement node to perform, by the first settlement node or the second settlement node, cross-currency fund settlement.

In the foregoing technical solutions, when cross-currency settlement nodes perform cross-currency settlement using a transit node, after the first settlement node and the second settlement node respectively transfer off-chain funds of different currencies to the settlement accounts opened at the first settlement node and the second settlement node by the transit node, the off-chain funds in the settlement accounts can be frozen, and blockchain assets corresponding to the frozen off-chain funds in the settlement accounts can be issued on the blockchain. Then a cross-currency fund exchange is completed based on the blockchain assets issued on the blockchain without directly using the off-chain funds. Therefore, a problem of a relatively long fund delivery cycle caused by different system accounting time of bank nodes and the transit node in a cross-currency fund exchange that directly uses off-chain funds can be reduced or avoided, and the effectiveness of the cross-currency fund exchange can be significantly improved when implementing real-time settlement based on a blockchain asset.

DETAILED DESCRIPTION

Figure 1:
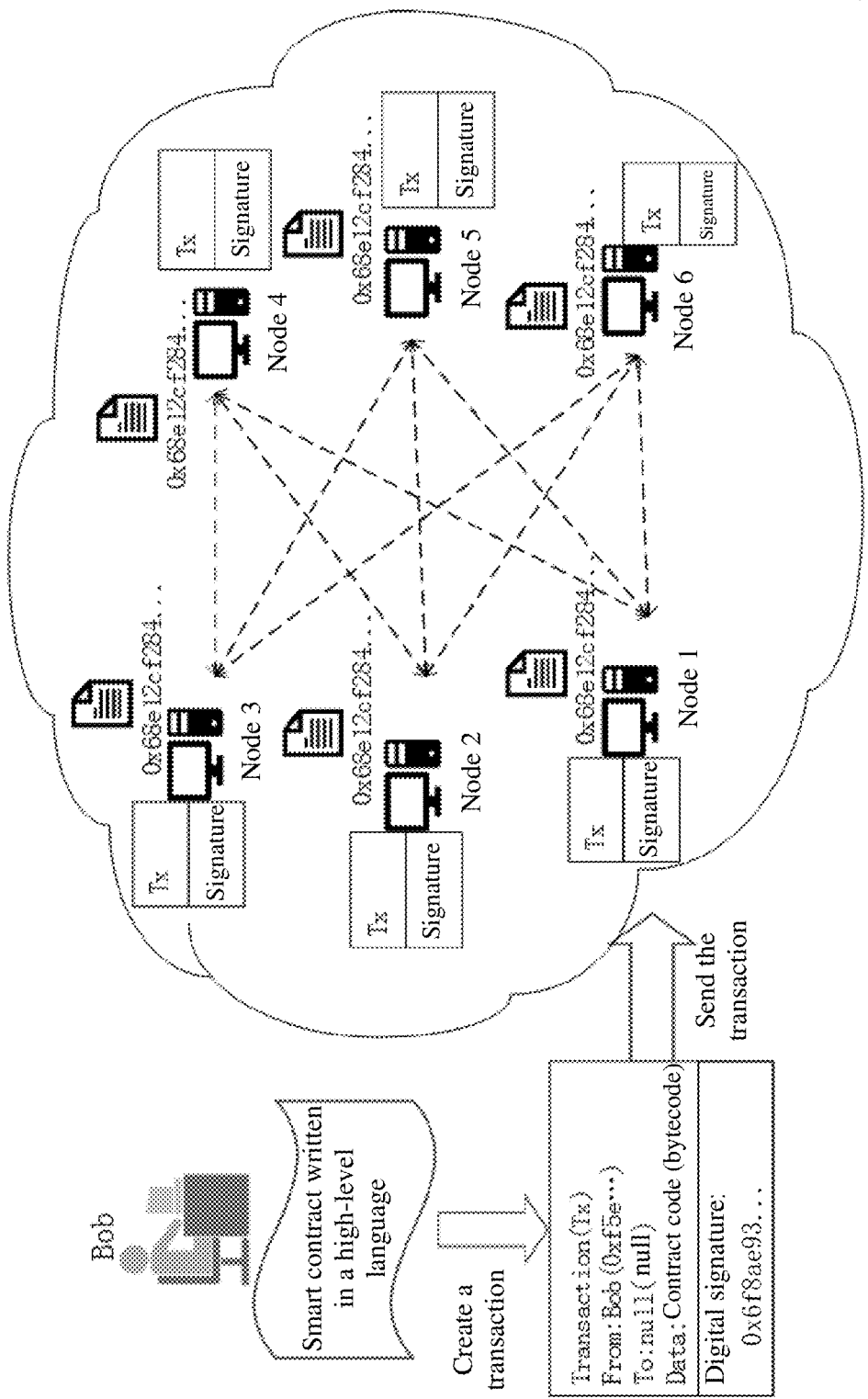
FIG. 1 is an example schematic of creating a smart contract, according to some embodiments of this specification.

The following describes details of embodiments of this specification with reference to the accompanying drawings. The accompanying drawings show some embodiments of this specification, and this specification may be implemented in various manners and is not limited by the embodiments described herein. Rather, these embodiments are provided, so that this specification is more thoroughly understood and the scope of this specification is completely conveyed to a person skilled in the art.

In many embodiments, the steps of corresponding methods are not necessarily performed according to a sequence shown and described in this specification. In some other embodiments, the methods may include more or fewer steps than those described in this specification. In addition, a single step described in this specification may be divided into a plurality of steps for description in other embodiments, and a plurality of steps described in this specification may be combined into a single step for description in other embodiments.

Blockchains may be generally classified into three types: a public blockchain, a private blockchain, and a consortium blockchain. In addition, there may also be a combination of the types. For example, there can be a combination of a private blockchain and a consortium blockchain, or a combination of a consortium blockchain and a public blockchain.

The public blockchain may have the highest degree of decentralization. For the public blockchain, such as Bitcoin and Ethereum, participants joining the public blockchain (also referred to as nodes in the blockchain) may read data records on the blockchain, participate in transactions, compete for accounting rights on a new block, etc. Moreover, each node may freely join or exit the blockchain network and perform related operations.

The private blockchain may be opposite. In the private blockchain, data write permissions may be controlled by one or more organizations or institutions, and data read permissions may be specified by one or more organizations. The private blockchain may be a weakly centralized system with stricter restrictions on nodes and a relatively small quantity of nodes. A blockchain of such type can be more suitable for internal use in a particular institution.

The consortium blockchain is a blockchain between the public blockchain and the private blockchain, and may achieve partial decentralization. Nodes in the consortium blockchain can generally correspond to a number of entities or organizations. The nodes can join the blockchain through authorization to form a stakeholder consortium and jointly maintain the running of the blockchain.

Based on the basic characteristics of a blockchain, the blockchain generally includes a plurality of blocks. Timestamps corresponding to moments at which these blocks are created are respectively recorded in the blocks. These blocks follow the timestamps recorded in the blocks to form a time-ordered data chain.

In some embodiments, for data generated in the physical world, the data may be constructed in a standard transaction format that is supported by the blockchain, and then published to the blockchain. Nodes in the blockchain can perform consensus processing on a received transaction. After a consensus is reached, a node can act as an accounting node in the blockchain and package the transaction into a block for persistent storage in the blockchain.

In some embodiments, consensus algorithms supported in the blockchain may include the following. In a first type of consensus algorithm, nodes or node devices compete for accounting rights of each round of accounting cycle. The competing process can include, for example, Proof of Work (PoW), Proof of Stake (PoS), or Delegated Proof of Stake (DPoS). In a second type of consensus algorithm, an accounting node is selected in advance for each round of accounting cycle, and there may not be a competition for accounting rights. For example, the second type of consensus algorithm can include Practical Byzantine Fault Tolerance (PBFT).

In a blockchain network using the first type of consensus algorithm, after receiving a transaction, node devices competing for accounting rights may execute the transaction. In the node devices competing for accounting rights, there may be one node device winning in a current round of competing for accounting rights, and becoming an accounting node. The accounting node may package the received transaction and another transaction together to generate a candidate block, and send the generated candidate block or a block header of the candidate block to another node device for consensus processing.

In a blockchain network using the second type of consensus algorithm, a node device having accounting rights is agreed on before a current round of accounting. Therefore, after receiving a transaction, if a node device is not the accounting node of the current round, the node device may send the transaction to the accounting node. The accounting node of the current round may execute the transaction when or before packaging the transaction and another transaction together to generate a candidate block. After generating the candidate block, the accounting node may send the generated candidate block or a block header of the candidate block to another node device for consensus processing.

As described above, no matter which one of the consensus algorithms is used on the blockchain, the accounting node of the current round may package a received transaction to generate a candidate block, and send the generated candidate block or a block header of the candidate block to another node device for verification and consensus processing. If the verification succeeds after the other node device receives the candidate block or the block header of the candidate block, the candidate block may be used as the latest block and added to the end of the blockchain, so as to complete for an accounting process of the blockchain. When verifying the new block or the block header sent by the accounting node, the other node device may execute the transaction included in the block.

In the field of blockchains, the blockchains may be generally classified into different types based on accounting manners supported by the blockchains. One type of the blockchains uses an unspent transaction output (UTXO) model, such as Bitcoin. Another type of the blockchains uses an account based model, such as Ethereum.

For the blockchain using the account based model, an object supported on the blockchain is generally represented in the form of an account. For example, objects supported by Ethereum generally include two types: an external object and a contract object. Therefore, accounts supported by Ethereum can be classified into two types: an external account and a contract account. The external object can be a user, and the external account can be an account directly controlled by the user, also referred to as a user account. The contract object is generally a smart contract, and the contract account is an account that is created by a user using an external account. The contract account can include executable smart contract code.

For some blockchain models (e.g., AntChain) that are based on the account based model, account types supported by the blockchain may be further increased beyond the external account and the contract account, which is not particularly limited in this specification.

For an account on the blockchain, an account state of the account generally is maintained using a structure. After a transaction in a block is executed, a state of an account corresponding to the transaction on the blockchain generally changes.

For the blockchain using the account based model, a structure of an account may include fields such as Balance, Nonce, Code, and Storage.

The field Balance can be used for maintaining a current account balance of the account.

The field Nonce can be used for maintaining a quantity of transactions of the account, and can be a counter used for ensuring that each transaction may be processed only once, to effectively prevent a replay attack.

The field Code can be used for maintaining contract code of the account. For example, the field Code may maintain a hash value of the contract code. Therefore, the field Code can also be referred to as a field Codehash.

The field Storage can be used for maintaining stored content of the account. By default, a value for the field storage can be set to a null value. An independent storage space can be allocated to a contract account to store content of the contract account. The independent storage space can be referred to as an account storage of the contract account.

As an example, the content of the contract account can be constructed in a data structure of a Merkle Patricia Trie (MPT) when it is stored in the independent storage space. The MPT based on the content of the contract account can be referred to as a storage tree. The field Storage may maintain only a root node of the storage tree. In addition, the field Storage may be referred to as a field StorageRoot.

For the external account, field values of both the field Code and the field Storage can be null values.

The public blockchain, the private blockchain, or the consortium blockchain may provide a function of a smart contract. A smart contract on a blockchain is a contract that may be triggered by a transaction to be executed on the blockchain. The smart contract may be defined in the form of code.

For example, a user is allowed to create and call some complex logic on an Ethereum network. Ethereum is a programmable blockchain, and a core of Ethereum is an Ethereum virtual machine (EVM). Each Ethereum node may run an EVM. The EVM is a Turing-complete virtual machine, which can be used to implement various complex logic. A smart contract published and called by a user in Ethereum is run on the EVM. The EVM can run virtual machine code, which is virtual machine bytecode or simply referred to as bytecode. Therefore, the smart contract deployed on the blockchain may be bytecode.

FIG. 1 is an example schematic of creating a smart contract, according to some embodiments of this specification. As shown in FIG. 1, a user Bob sends a transaction including information for creating a smart contract to an account based blockchain (e.g., Ethereum network). Each node may execute the transaction in an EVM. The transaction can include a number of fields, including a field From, a field To, and a field Data as shown in FIG. 1, The field From of the transaction is used for recording an address of an account that initiates the creation of the smart contract. The field Data of the transaction stores contract code, which may be bytecode. The field To of the transaction is a null account. When nodes in the Ethereum network reach a consensus through a consensus mechanism, the smart contract is created successfully, and a user subsequently may call the smart contract.

After the smart contract is created, a contract account corresponding to the smart contract appears on a blockchain and has a specific address. For example, "0x68e12cf284 . . . " in each node in FIG. 1 represents the address of the created contract account. The field Code and the field Storage of the contract account are stored in the account storage of the contract account. Behavior of the smart contract is controlled by the contract code, and the account storage of the smart contract maintains a state of the contract. In other words, the smart contract enables a virtual account including contract code and account storage to be generated on the blockchain.

As described above, the field Data of the transaction including the information for creating the smart contract may store bytecode of the smart contract. The bytecode includes a string of bytes, and each byte may identify an operation. A developer may not directly write bytecode but select a high-level language to write the smart contract code to achieve higher efficiency, readability, etc.

For example, the high-level language may be a language such as Solidity, Serpent, or a Lisp-like language (LLL). The smart contract code written in a high-level language may be compiled by a compiler to generate bytecode that can be deployed on the blockchain. For example, contract code written in Solidity may be similar to a class in an object-oriented programming language. A variety of members may be declared in a contract, such as a state variable, a function, a function modifier, an event, etc. The state variable can be a value permanently stored in the field Storage of the smart contract and can be used for maintaining a state of the contract.

Figure 2:
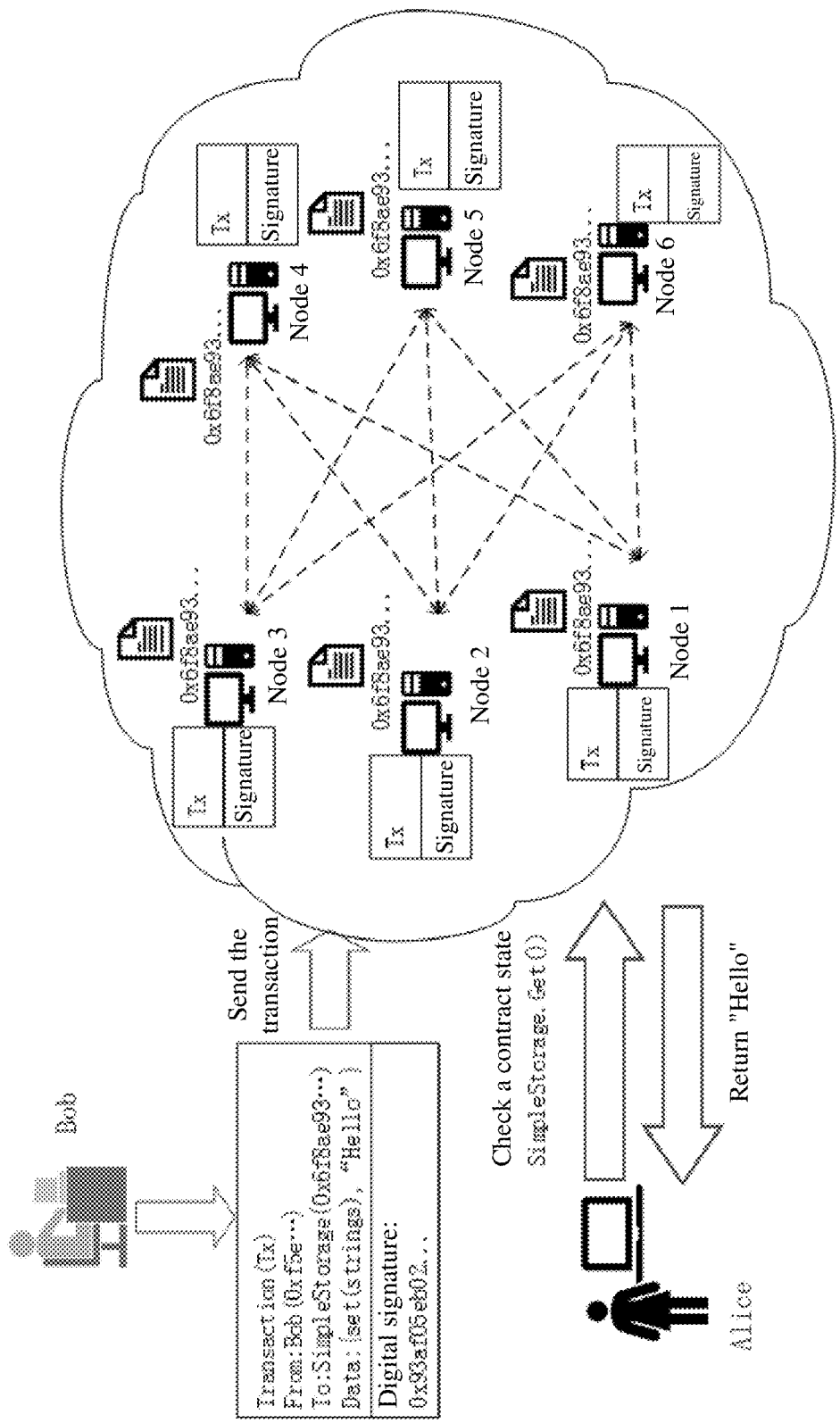
FIG. 2 is an example schematic of calling a smart contract, according to some embodiments of this specification.

FIG. 2 is an example schematic of calling a smart contract, according to some embodiments of this specification. As shown in FIG. 2, Ethereum is still used as an example. A user Bob sends a transaction including information for calling a smart contract to an Ethereum network. Each node may execute the transaction in an EVM. As shown in FIG. 2, the transaction can include a number of fields, including a field From, a field To, and a field Data. The field From of the transaction is used for recording an address of an account that initiates the calling of the smart contract. The field To of the transaction is used for recording an address of the called smart contract The field Data of the transaction is used for recording a method and a parameter for calling the smart contract. After the smart contract is called, an account state of a contract account may be changed. Subsequently, a client may check the account state of the contract account by using an accessed blockchain node (e.g., a node 1 in FIG. 2).

The smart contract may be executed independently on each node in a blockchain network in a specified manner. All execution records and data can be stored on the blockchain. Therefore, after such a transaction is executed, the transaction credential of the transaction stored on the blockchain may not be tampered with and may not be lost.

Figure 3:
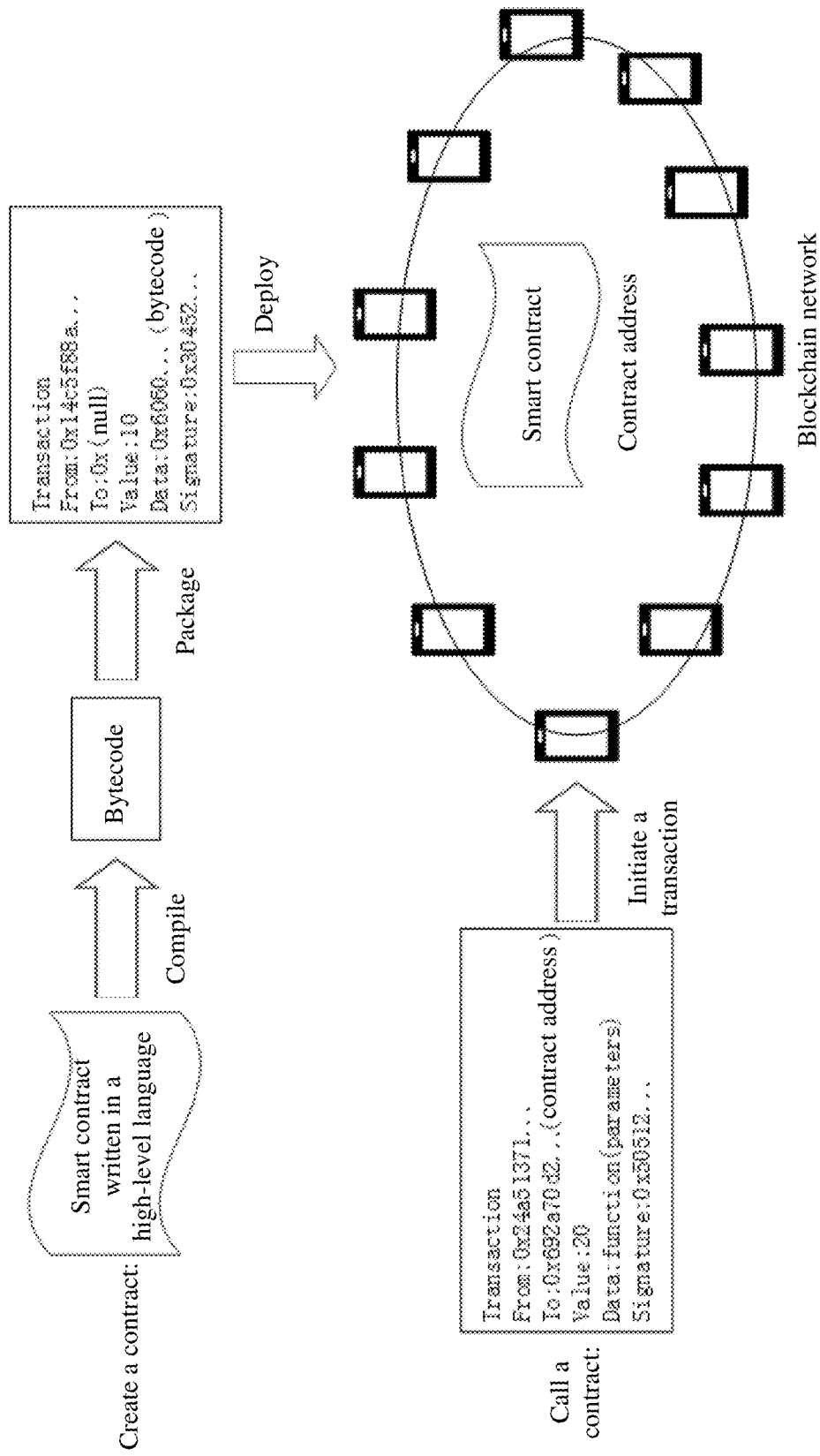
FIG. 3 is an example schematic of creating and calling a smart contract, according to some embodiments of this specification.

FIG. 3 is an example schematic of creating and calling a smart contract, according to some embodiments of this specification. To create a smart contract in a blockchain (e.g., Ethereum), processes such as writing the smart contract, generating bytecode, and deploying the bytecode on a blockchain are needed. Calling a smart contract in Ethereum can initiate a transaction that points to an address of the smart contract. An EVM of each node may execute the transaction separately, so that smart contract code is run in a distributed way in the virtual machine of each node in an Ethereum network.

In the blockchain using the account based model, such as Ethereum, to implement a "value transfer" on the blockchain, a currency in the real world may be converted into a virtual token that can circulate on the blockchain.

In the field of blockchains, for some blockchain models (e.g., AntChain) derived based on the account based model, the function of converting a currency in the real world into a virtual token that can circulate on a blockchain is generally not supported. Instead, in these blockchain models, currencies and some non-monetary physical assets in the real world may be converted into virtual assets that can circulate on the blockchain.

Converting a currency or a non-monetary physical asset in the real world into a virtual asset on a blockchain is generally a process of "anchoring" the currency or the physical asset with a virtual asset on the blockchain as value support of the virtual asset, and generating, on the blockchain, a virtual asset that matches the value of the currency or the physical asset and can circulate between blockchain accounts on the blockchain.

The account types supported by the blockchain may be increased. That is, objects supported by the blockchain can be increased. For example, an asset account (also referred to as an asset object) can be added based on an existing account type supported by the blockchain. An asset account may be further added based on an external account and a contract account supported by the blockchain. The added asset account is a virtual asset that uses a currency or a non-monetary physical asset in the real world as value support and can circulate freely between blockchain accounts.

For a user accessing such a blockchain, in addition to completing the creation of a user account and a smart contract on the blockchain, the user may further create, on the blockchain, a virtual asset that matches the value of a currency or a non-monetary physical asset in the real world and circulates on the blockchain. For example, the user may convert non-monetary physical assets such as real estate, stocks, a loan contract, notes, receivables, etc. into virtual assets with matched value to circulate on the blockchain.

An account state of the asset account may also be maintained using a structure. Content included in the structure of the asset account may be the same as the content included in the structure of the account supported by the foregoing described blockchain using the account based model. The content may alternatively be designed autonomously based on practical requirements. The structure of the asset account may also include the foregoing described fields such as Balance, Nonce, Code, and Storage.

The field Balance may be used for maintaining a current account balance of an account. However, for a blockchain model derived based on the account based model, the blockchain model may not support the function of converting a currency in the real world into a virtual token that can circulate on a blockchain. Therefore, for such a blockchain, the meaning of the field Balance may be extended, so that the field does not represent a "balance" of an account. For example, the field Balance can be used for maintaining address information of an asset account corresponding to the "virtual asset" held in the account. The field Balance may also be used to maintain address information of asset accounts corresponding to a plurality of "virtual assets."

In this case, the external account, the contract account, and the asset account all can add, into the field Balance, address information of an asset account corresponding to a "virtual asset". As a result, the external account, the contract account, and the asset account all can hold the virtual asset.

For the asset account, the field Nonce and the field Code may be set to null values (or may not be set to null values), and the field Storage may not be set to a null value. The field Storage may be used for maintaining an asset state of a "virtual asset" corresponding to the asset account. A specific manner of maintaining the asset state of the "virtual asset" corresponding to the asset account in the field Storage may be flexibly designed based on practical requirements and is not detailed herein.

In the blockchain model derived based on the account based model, a user may create, on a blockchain using the following implementation, a virtual asset that matches the value of a currency or a non-monetary physical asset in the real world.

In some embodiments, transaction types supported by the blockchain may be increased to add a transaction for creating a virtual asset. For example, transaction types supported by Ethereum generally include an ordinary transfer transaction, a transaction for creating a smart contract, and a transaction for calling a smart contract. A transaction for creating a virtual asset may be added on top of the three types of transactions.

In this case, the user may publish (e.g., using a client) a transaction for creating a virtual asset to a blockchain network. A node device in the blockchain executes the transaction in a local EVM to create a virtual asset for the user. When node devices reach a consensus through a consensus mechanism, the virtual asset is successfully created, and an asset account corresponding to the virtual asset appears on the blockchain and has a specific address.

In some embodiments, a smart contract for creating a virtual asset may be deployed on the blockchain. The process of deploying the smart contract for creating a virtual asset is not repeated herein.

In this case, the user may publish (e.g., using a client) a transaction for calling the smart contract to a blockchain network. A node device in the blockchain executes the transaction in a local EVM and runs contract code related to the smart contract in the EVM to create a virtual asset for the user. When node devices reach a consensus through a consensus mechanism, the virtual asset is successfully created, and an asset account corresponding to the virtual asset appears on the blockchain and has a specific address.

In some embodiments, some blockchain models derived based on Ethereum also support the function of converting a currency in the real world into a virtual token that can circulate on a blockchain As a result, some non-monetary physical assets in the real world may still be converted into virtual tokens that can circulate on the blockchain.

Embodiments of this specification provide technical solutions of performing real-time cross-currency settlements using one or more transit nodes. The real-time cross-currency settlements can be based on a blockchain asset that corresponds to settlement funds in a settlement account opened at a settlement node by an intermediate node.

In some embodiments, a settlement system may be built based on a blockchain. The settlement system can include a first settlement node inside a territory, a transit node, and a second settlement node outside the territory. The transit node can open a first settlement account at the first settlement node and a second settlement account at the second settlement node.

During cross-currency fund settlement based on the settlement system, it may be determined that off-chain funds of a first currency transferred by the first settlement node to the first settlement account are in a frozen state. In such a scenario, a node device in the blockchain may create and add, for the transit node, a first blockchain asset corresponding to the off-chain funds of the first currency in the blockchain. It may also be determined that off-chain funds of a second currency transferred by the second settlement node to the second settlement account are in a frozen state.

In such a scenario, a node device in the blockchain may create and add, for the transit node, a second blockchain asset corresponding to the off-chain funds of the second currency in the blockchain.

After the first blockchain asset and the second blockchain asset are created on the blockchain for the transit node, the transit node may create a fund exchange transaction. In some embodiment, the fund exchange transaction can be created according to fund exchange instructions from the first settlement node and the second settlement node. In some embodiments, the transit node can publish the fund exchange transaction to the blockchain.

In response to receiving the fund exchange transaction, the node device in the blockchain may transfer the first blockchain asset from a blockchain account corresponding to the transit node to a blockchain account corresponding to the second settlement node, and transfer the second blockchain asset from the blockchain account corresponding to the transit node to a blockchain account corresponding to the first settlement node.

In some embodiments, after the fund exchange process is completed, the first settlement node and the second settlement node may further perform cross-currency fund settlement for users based on the blockchain assets transferred to the respective blockchain accounts.

In the foregoing technical solution, the transit node opens settlement accounts at the first settlement node and the second settlement node. The first settlement node and the second settlement node respectively transfer off-chain funds of different currencies to the settlement accounts opened by the transit node at the first settlement node and the second settlement node respectively. After the transfers to the settlement accounts, the off-chain funds in the settlement accounts can be frozen, and blockchain assets corresponding to the frozen off-chain funds in the settlement accounts are issued on the blockchain. Then a cross-currency fund exchange is completed based on the blockchain assets issued on the blockchain without directly using the off-chain funds. Therefore, issues surrounding a relatively long fund delivery cycle caused by different system accounting time of bank nodes and the transit node in a cross-currency fund exchange that directly uses off-chain funds can be avoided, and the effectiveness of the cross-currency fund exchange can be significantly improved in order to implement real-time settlement based on a blockchain asset.

Figure 4:
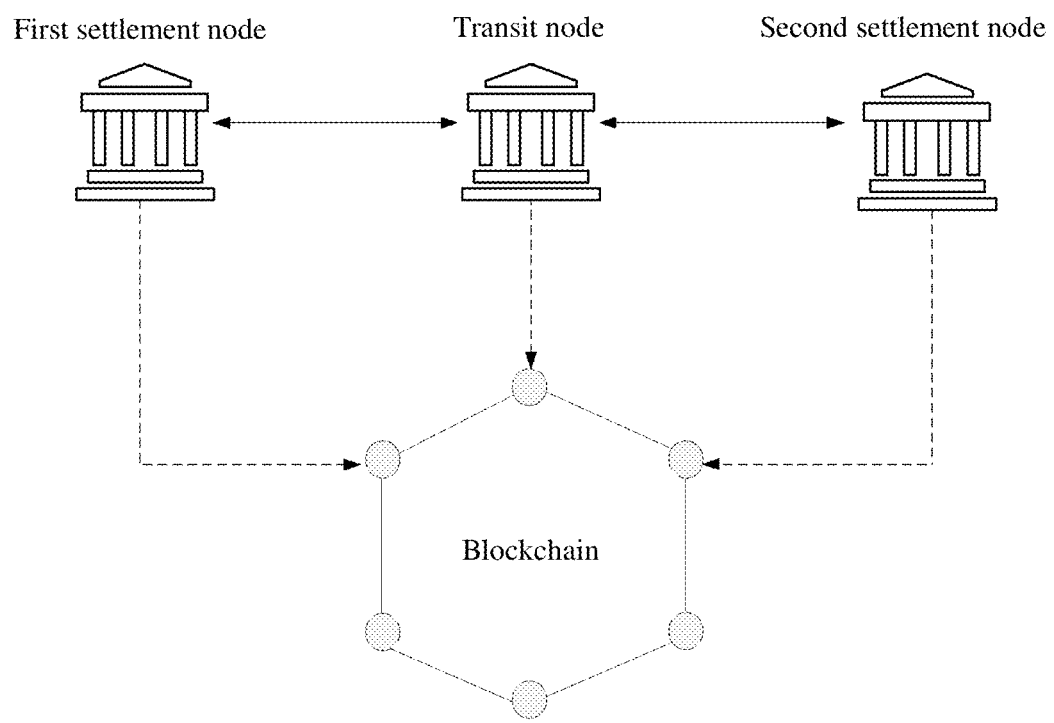
FIG. 4 is a schematic of an example blockchain-based settlement system, according to some embodiments of this specification.

FIG. 4 is a schematic of an example blockchain-based settlement system, according to some embodiments of this specification. As shown in FIG. 4, the settlement system may include a first settlement node inside a territory, a transit node, and a second settlement node outside the territory.

In some embodiments, the first settlement node, the transit node, and the second settlement node may be added to a blockchain network as node devices of the blockchain network to jointly maintain a blockchain ledger. In some embodiments, the first settlement node, the transit node, and the second settlement node may not be added to the blockchain as node devices of the blockchain, but access the blockchain by maintaining a connection with a node device on the blockchain, and storing data generated thereof on the blockchain.

In some embodiments, the first settlement node and the second settlement node may be banks, and the transit node may be an intermediary bank, or a non-bank institution that serves as a transit entity. The non-bank institution may include a third-party payment institution, an issuing institution of a stored value instrument, etc. For example, the stored value instrument may be E-Money or a prepaid card.

In some embodiments, when the transit node is an intermediary bank, the intermediary bank may be a branch bank of the first settlement node in a territory in which the second settlement node is located. In some embodiments, the transit node may be a branch bank of the second settlement node in the territory in which the first settlement node is located.

In the settlement system shown in FIG. 4, the transit node may open settlement accounts at the first settlement node and the second settlement node. The settlement account opened at the first settlement node by the transit node may be referred to as a first settlement account, and the settlement account opened at the second settlement node by the transit node may be referred to as a second settlement account.

In some embodiments, specific types of the settlement accounts opened at the first settlement node and the second settlement node by the transit node are related to a node type of the transit node. For example, when the transit node is an intermediary bank, the first settlement account and the second settlement account may be a nostro/vostro account, a bank reserve account, a trust account, etc. When the transit node is a non-bank institution, the first settlement account and the second settlement account may include client reserve accounts opened at bank nodes by the non-bank institution.

As shown in FIG. 4, the first settlement node located inside the territory and the second settlement node located outside the territory may perform a cross-currency fund settlement using the transit node. For example, the cross-currency fund settlement may be cross-currency remittance settlement or cross-currency foreign exchange transaction settlement.

Figure 5:
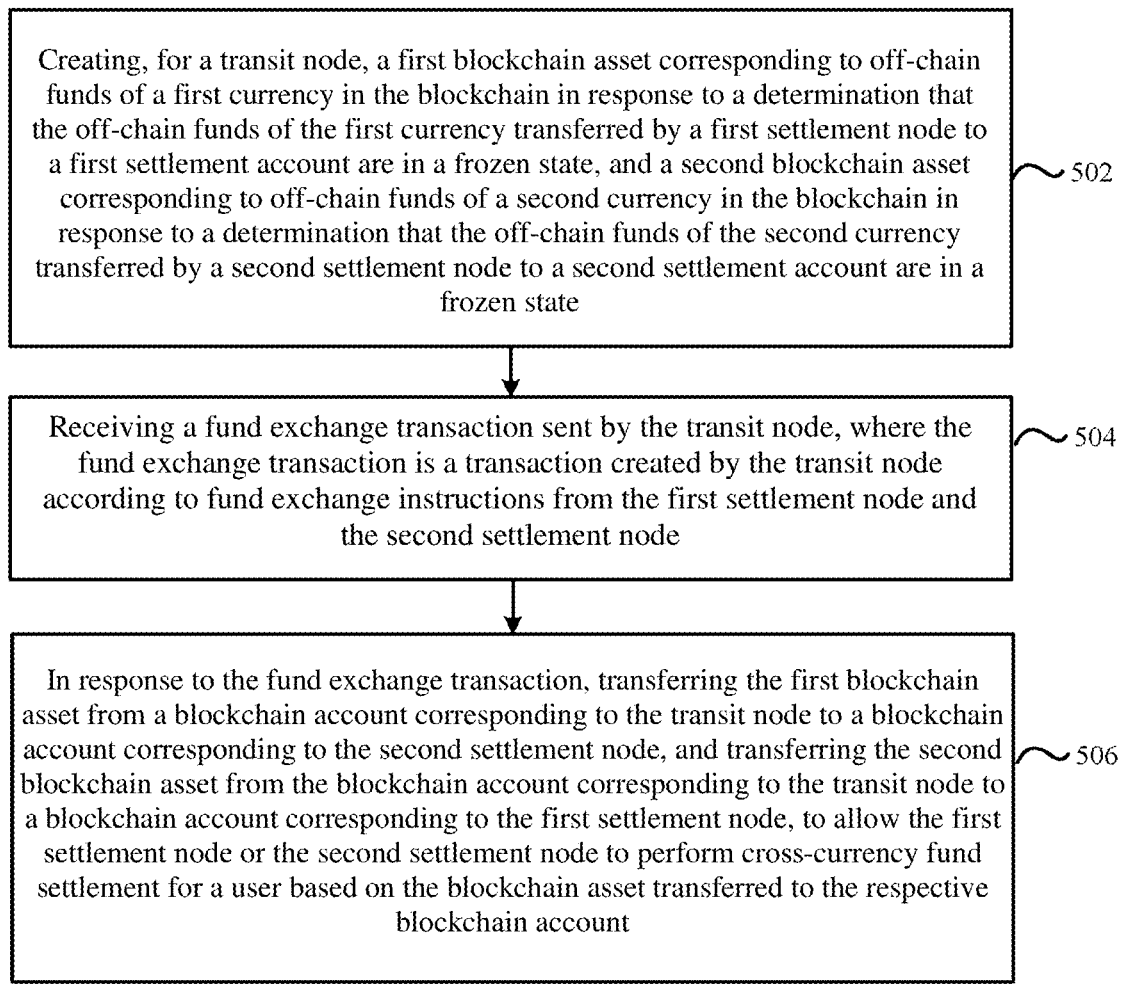
FIG. 5 is a flowchart of an example blockchain-based cross-currency settlement method, according to some embodiments of this specification.

FIG. 5 is a flowchart of an example blockchain-based cross-currency settlement method, according to some embodiments of this specification. It is appreciated that the method shown in FIG. 5 can be performed by a settlement system (e.g., the settlement system shown in FIG. 4). In some embodiments, similar to the settlement system shown in FIG. 4, the settlement system can include a first settlement node inside a territory, a transit node, and a second settlement node outside the territory. The first settlement node, the transit node, and the second settlement node can be added to a blockchain network as node devices of the blockchain network. The method of FIG. 5 can include steps 502, 504, and 506.

In step 502, a first blockchain asset corresponding to off-chain funds of a first currency and a second blockchain asset corresponding to off-chain funds of a second currency are created and added for a transit node (e.g., the transit node of FIG. 4) in the blockchain network. In some embodiments, the first blockchain asset is created in response to a determination that the off-chain funds of the first currency transferred by a first settlement node (e.g., the first settlement node of FIG. 4) to a first settlement account are in a frozen state. In some embodiments, the second blockchain asset is created in response to a determination that the off-chain funds of the second currency transferred by a second settlement node (e.g., the second settlement node) to a second settlement account are in a frozen state.

In step 504, a fund exchange transaction sent by the transit node is received by the blockchain network. In some embodiments, the fund exchange transaction is created by the transit node according to fund exchange instructions from the first settlement node and the second settlement node.

In step 506, in response to the fund exchange transaction, the first blockchain asset from a blockchain account corresponding to the transit node is transferred to a blockchain account corresponding to the second settlement node, and the second blockchain asset from the blockchain account corresponding to the transit node is transferred to a blockchain account corresponding to the first settlement node, to allow the first settlement node or the second settlement node to perform cross-currency fund settlement for a user based on the blockchain asset transferred to the respective blockchain account. In some embodiments, the first blockchain asset and the second blockchain asset are transferred by the blockchain network. For example, the first blockchain asset and the second blockchain asset can be transferred by the transit node of the blockchain network.

The technical solutions of this specification are described in more details below using an example where both the first settlement node and the second settlement node are banks. It is appreciated that both the first settlement node and the second settlement node being banks is merely an example. In some embodiments, either of the first settlement node and the second settlement node may be a non-bank institution, such as a third-party payment institution or an issuing institution of a stored value instrument.

In some embodiments, the first bank node located inside the territory (e.g., the first settlement node of FIG. 4) and the second bank node located outside the territory (e.g., the second settlement node of FIG. 4) do not accept counterparty risks of each other, As a result, a nostro/vostro account may not be opened at each other to deposit any form of assets. In this case, if the first bank node and the second bank node need to perform cross-currency fund settlement, an intermediate node can be used. The intermediate node can open settlement accounts at the first bank node and the second bank node where the counterparty risk of the intermediate node can be accepted by both the first bank node and the second bank node. In some embodiments, the intermediate node can function in a similar fashion as the transit node (e.g., transit node of FIG. 4).

In some embodiments, the intermediate node may be an intermediary bank whose counterparty risk is accepted by both the first bank node and the second bank node. In some embodiments, the intermediate node may be a non-bank institution whose counterparty risk is accepted by both the first bank node and the second bank node. For example, the intermediate node may be a third-party payment institution or an issuing institution of a stored value instrument.

In some embodiments, if the intermediate node is an intermediary bank, the settlement accounts opened at the first bank node and the second bank node by the intermediate node may be nostro/vostro accounts. Because a nostro/vostro account is a basic account type supported by a global banking system, the use of the nostro/vostro accounts can provide a higher versatility.

In some embodiments, the settlement account may be a bank reserve account, a trust account, etc. In some embodiments, the settlement account may have a slightly lower versatility than the nostro/vostro account.

In some embodiments, if the intermediate node is a non-bank institution, the settlement accounts opened at the first bank node and the second bank node by the intermediate node may be client reserve accounts opened at the bank nodes by the non-bank institution. Because a client reserve account is a basic account type supported by global banking systems, the use of the client reserve accounts can also provide a higher versatility.

In some embodiments, after the first bank node and the second bank node determines the intermediate node, the first bank node and the second bank node may complete a cross-currency fund settlement with each other using the intermediate node whose counterparty risk is accepted as a fund transit. For example, the first bank node may transfer to-be-settled off-chain funds of a first currency to the first settlement account opened at the first bank node by the intermediate node. The second bank node may also transfer to-be-settled off-chain funds of a second currency to the second settlement account opened at the second bank node by the intermediate node. In some embodiments, the off-chain funds of the first currency and the off-chain funds of the second currency may be equivalent currencies converted according to an exchange rate.

In some embodiments, after the first bank node and the second bank node respectively transfer the off-chain funds of the first currency and the off-chain funds of the second currency to the first settlement account and the second settlement account, the first bank node and the second bank node may respectively freeze the off-chain funds in the first settlement account and the off-chain funds in the second settlement account, and then issue blockchain assets corresponding to the frozen funds on the blockchain using the frozen funds as value support.

It is appreciated that a specific form of the blockchain asset is not particularly limited in this specification. The blockchain asset may be in the form of the asset object described above, or may use other forms. For example, the blockchain asset may be an on-chain balance issued on the blockchain based on the frozen off-chain funds.

In some embodiments, after determining that the off-chain funds in the first settlement account and the second settlement account are in a frozen state, a node device in the blockchain may create and add, for the transit node, a first blockchain asset corresponding to the off-chain funds of the first currency and a second blockchain asset corresponding to the off-chain funds of the second currency on the blockchain. In some embodiments, the node device that creates the first blockchain asset can be the first bank node, the second bank node, or the transit node.

In some embodiments, a smart contract for managing a blockchain asset may be deployed on the blockchain. The process of deploying the smart contract on the blockchain is not repeated herein. The smart contract can include contract code of an execution logic corresponding to the contract code. The execution logic corresponding to the contract code in the smart contract may include an asset creation logic, an asset exchange logic, an asset conversion logic, etc.

In some embodiments, after freezing the off-chain funds of the first currency transferred to the first settlement account, the first bank node may generate a freeze credential for the funds, construct an asset creation transaction including the freeze credential for the funds, and then publish the asset creation transaction to the blockchain. In some embodiments, the asset creation transaction may be a smart contract calling transaction.

In some embodiments, after a consensus is reached on the asset creation transaction, the node device in the blockchain may call the asset creation logic in the smart contract to create, for the transit node, the first blockchain asset corresponding to the off-chain funds of the first currency in the blockchain based on the freeze credential, and add the created first blockchain asset to the blockchain account corresponding to the transit node for holding. For example, when the first blockchain asset is the asset account described above, address information of the asset account corresponding to the first blockchain asset may be added to a field Balance of the blockchain account corresponding to the transit node. When the first blockchain asset is an on-chain balance issued on the blockchain based on the frozen off-chain funds, an account balance maintained by the field Balance of the blockchain account corresponding to the transit node may be updated based on the on-chain balance.

In some embodiments, after freezing the off-chain funds of the second currency, the second bank node may generate a freeze credential for the funds, construct an asset creation transaction including the freeze credential for the funds, and then publish the asset creation transaction to the blockchain. In some embodiments, the asset creation transaction may be a smart contract calling transaction.

In some embodiments, after a consensus is reached on the asset creation transaction, the node device in the blockchain may call the asset creation logic in the smart contract to create, for the transit node, the second blockchain asset corresponding to the off-chain funds of the second currency in the blockchain based on the freeze credential, and add the created second blockchain asset to the blockchain account corresponding to the transit node for holding.

In some embodiments, after the first bank node and the second bank node issue blockchain assets corresponding to the frozen funds on the blockchain using the frozen funds as value support, the first bank node and the second bank node may each send a fund exchange instruction to the intermediate node. It is appreciated that a specific form of the fund exchange instruction is not limited in this specification. For example, the fund exchange instruction may be an instruction or a command line that is supported by the intermediate node and used for triggering a fund exchange.

In some embodiments, after determining that the fund exchange instructions from the first bank node and the second bank node are received, the intermediate node may create a fund exchange transaction according to the fund exchange instructions, and then publish the fund exchange transaction to the blockchain. In some embodiments, the fund exchange transaction may also be a smart contract calling transaction.

In some embodiments, after a consensus is reached on the fund exchange transaction, the node device in the blockchain may call the asset exchange logic in the smart contract to transfer the first blockchain asset held in the blockchain account corresponding to the transit node to the blockchain account corresponding to the second bank node and transfer the second blockchain asset held in the blockchain account corresponding to the transit node to the blockchain account corresponding to the first bank node. For example, when the blockchain asset is the asset account, the address information of the asset account corresponding to the first blockchain asset may be deleted from the field Balance in the structure of the blockchain account corresponding to the transit node, and then the address information of the asset account corresponding to the first blockchain asset can be added to the field Balance in the structure of the blockchain account corresponding to the second bank node. Moreover, the address information of the asset account corresponding to the second blockchain asset may be deleted from the field Balance in the structure of the blockchain account corresponding to the transit node, and then the address information of the asset account corresponding to the second blockchain asset can be added to the field Balance in the structure of the blockchain account corresponding to the first bank node.

In some embodiments, when the blockchain asset is the on-chain balance issued on the blockchain based on the frozen off-chain funds, an account balance corresponding to an asset type of the first blockchain asset may be deducted from the field Balance in the structure of the blockchain account corresponding to the transit node, and then the account balance corresponding to the asset type of the first blockchain asset can be added to an account balance corresponding to the asset type of the first blockchain asset to the field Balance in the structure of the blockchain account corresponding to the second bank node. Moreover, an account balance corresponding to an asset type of the second blockchain asset may be deducted from the field Balance in the structure of the blockchain account corresponding to the transit node, and then the account balance corresponding to the asset type of the second blockchain asset can be added to an account balance that is maintained by the field Balance in the structure of the blockchain account corresponding to the first bank.

In some embodiments, after the node device of the blockchain completes the asset exchange process described above, the first bank node and the second bank node may perform a cross-currency fund settlement for users based on the blockchain assets transferred to the respective blockchain accounts.

In some embodiments, the user may be a natural person opening a settlement account at the first bank node or the second bank node, or may be a non-bank institution opening a client reserve account at the first bank node or the second bank node. For example, the non-bank institution may be a third-party payment institution or an issuing institution of a stored value instrument.

In some embodiments, when the first bank node and the second bank node perform cross-currency fund settlement for respective users based on the blockchain assets transferred to the respective blockchain accounts, if the users accept cross-currency fund settlement based on the blockchain asset rather than the off-chain funds, the cross-currency fund settlement may be directly performed for the users based on the blockchain assets. If the users accept cross-currency fund settlement based on the off-chain funds rather than the blockchain asset, after the blockchain asset is converted into off-chain funds, the cross-currency fund settlement may be performed for the users based on the converted off-chain funds.

The following provides a description using an example in which the first bank node performs cross-currency fund settlement for a user based on the blockchain asset transferred to the blockchain account of the first bank node.

In some embodiments, assuming that the user accepts cross-currency fund settlement based on the blockchain asset, the user may send an instruction of performing cross-currency fund settlement based on the blockchain asset to the first bank node. A specific form of the instruction is not limited in this specification. For example, the instruction may be an instruction or a command line that is supported by the bank node and used for instructing to perform cross-currency fund settlement based on the blockchain asset.

In some embodiments, after determining that the instruction from the user is received, the first bank node may create a fund settlement transaction according to the instruction, and then publish the fund settlement transaction to the blockchain. In some embodiments, the fund settlement transaction may also be a smart contract calling transaction.

In some embodiments, after a consensus is reached on the fund settlement transaction, the node device in the blockchain may call the asset settlement logic in the smart contract to transfer the blockchain asset held in the blockchain account of the first bank node to a blockchain account of the user for holding.

In this way, when the user accepts the cross-currency fund settlement based on the blockchain asset, the cross-currency fund settlement may be performed using the blockchain assets that are issued on the blockchain and correspond to the settlement funds in the settlement accounts opened at the first bank node and the second bank node by the intermediate node. The real-time settlement may be implemented based on the blockchain assets.

In some embodiments, assuming that the user accepts cross-currency fund settlement based on the off-chain funds rather than the blockchain asset, the user may send an instruction of performing cross-currency fund settlement based on the off-chain funds to the first bank node. After determining that the instruction of performing cross-currency fund settlement based on the off-chain funds is received from the user, the first bank node may create a fund conversion transaction according to the instruction, and then publish the fund conversion transaction to the blockchain. In some embodiments, the fund conversion transaction may also be a smart contract calling transaction.

In some embodiments, after a consensus is reached on the fund conversion transaction, the node device in the blockchain may call the asset conversion logic in the smart contract to mark the blockchain asset held in the blockchain account of the first bank node in a deregistered state.

In some embodiments, because the blockchain asset held in the first bank node is an asset issued on the blockchain based on the off-chain assets frozen by the second bank node at a peer end of the first bank node as value support, the second bank node holds a liability corresponding to the blockchain asset. In this case, when determining that the blockchain asset held in the blockchain account of the first bank node at the peer end is marked in a deregistered state, the second bank node may unfreeze the off-chain funds corresponding to the blockchain asset, and then transfer the unfrozen off-chain funds to a settlement account opened at the first bank node or the second bank node by the user.

For example, if the user also opens a settlement account at the second bank node at the peer end of the first bank node, the second bank node may transfer, through balance transfer of an internal ledger, the unfrozen funds to the settlement account opened at the second bank node by the user. In this way, when the user does not accept cross-currency fund settlement based on a blockchain asset, a bank node holding a liability of the blockchain asset may unfreeze off-chain funds corresponding to the blockchain asset by calling the smart contract, and then perform cross-currency fund settlement for the user based on the unfrozen off-chain funds.

In some embodiments, if the user accepts cross-currency fund settlement based on the blockchain asset, after the blockchain asset is transferred to the blockchain account of the user for holding, if the user needs to convert the held blockchain asset into off-chain funds, a conversion of the blockchain asset held in the blockchain account of the user into the off-chain funds may be initiated.

In some embodiments, assuming that the user needs to convert the blockchain asset held in the blockchain account into the off-chain funds, the user may initiate an instruction of converting the held blockchain asset to a user client. After receiving the instruction, initiated by the user, of converting the held blockchain asset, the user client may create a fund conversion transaction according to the instruction, and then publish the fund conversion transaction to the blockchain. In some embodiments, the fund conversion transaction may also be a smart contract calling transaction.

In some embodiments, after a consensus is reached on the fund conversion transaction, the node device in the blockchain may call the asset conversion logic in the smart contract to mark the blockchain asset held in the blockchain account of the user in a deregistered state.

In some embodiments, because the blockchain asset held by the user is an asset issued on the blockchain based on the off-chain assets frozen by the second bank node at the peer end of the first bank node as value support, the second bank node holds a liability corresponding to the blockchain asset. In this case, when determining that the blockchain asset held in the blockchain account of the user is marked in a deregistered state, the second bank node may unfreeze off-chain funds corresponding to the blockchain asset, and then transfer the unfrozen off-chain funds to a settlement account opened at the first bank node or the second bank node by the user.

In the foregoing embodiments, descriptions are made using an example in which the first bank node performs cross-currency fund settlement for a user based on a blockchain asset transferred to a blockchain account of the first bank node. In some embodiments, a process in which the second bank node performs cross-currency fund settlement for a user based on a blockchain asset transferred to a blockchain account of the second bank node is similar to the foregoing described process and is not repeated in this specification.

It is appreciated that the cross-currency fund settlement described in the foregoing embodiments may include cross-currency fund settlement in any scenario, which is not particularly limited in this specification. For example, the scenario may include a cross-currency remittance settlement or a cross-currency foreign exchange transaction settlement.

Figure 6:
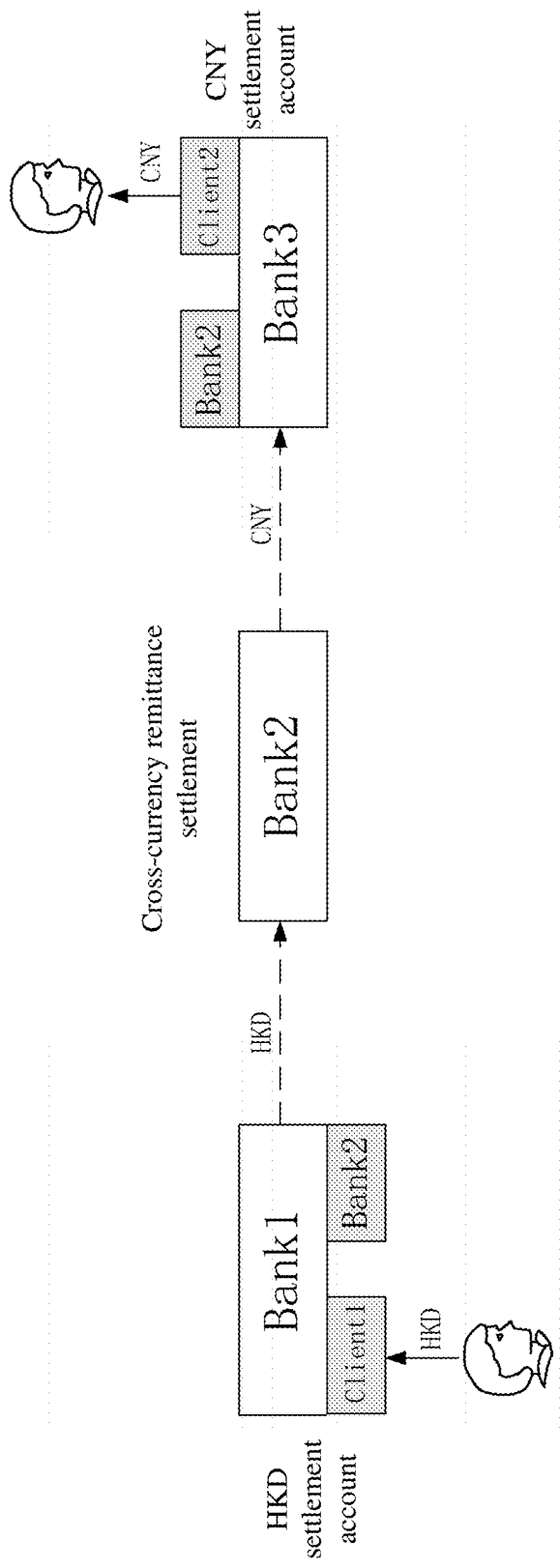
FIG. 6 is a schematic of an example cross-currency remittance settlement, according to some embodiments of this specification.

FIG. 6 is a schematic of an example cross-currency remittance settlement, according to some embodiments of this specification.

As shown in FIG. 6, a bank 1 is a Hong Kong branch or headquarter of a multinational bank. In some embodiments, the bank 1 can be one of the main settlement banks for Hong Kong dollar (HKD). A bank 3 is a branch or a headquarter of a Chinese-funded bank in Mainland China. In some embodiments, the bank 3 is one of the main settlement banks for Chinese Yuan (CNY). The bank 1 and the bank 3 may open foreign exchange transaction accounts between each other. If the bank 1 and the bank 3 do not accept counterparty risks of each other, nostro/vostro accounts may not be opened between each other to deposit any assets.

A client 1 opens an HKD settlement account (current account) at the bank 1, and deposits funds in HKD in the account. A client 2 opens a CNY settlement account at the bank 3, and deposits funds in CNY in the account.

A bank 2 shown in FIG. 6 can be a Mainland China branch of the bank 1 and serves as an intermediary bank in remittance settlement between the bank 1 and the bank 3.

In some embodiments, the bank 2 and the bank 1 accept counterparty risks of each other. As a result, the bank 2 can open a HKD nostro/vostro account at the bank 1 and deposits an HKD asset. The HKD nostro/vostro account opened at bank 1 can also be referred to as a first settlement account.

In some embodiments, the bank 2 and the bank 3 accept counterparty risks of each other. As a result, the bank 2 can open a CNY nostro/vostro account at the bank 3 and deposits a CNY asset. The CNY nostro/vostro account opened at bank 3 can also be referred to as a second settlement account.

In some embodiments, for a cross-currency remittance settlement, the client 1 needs to make a payment in HKD, and the payment is converted into equivalent CNY according to an agreed exchange rate, so as to remit the payment to the CNY settlement account opened at the bank 3 by the client 2. In this scenario, if an HKD amount deposited in the HKD settlement account opened at the bank 1 by the client 1 is sufficient, the bank 1 may deduct a corresponding HKD amount from the HKD settlement account of the client 1 according to a remittance amount from the client 1. After the deduction is successful, the bank 1 may deposit HKD corresponding to the remittance amount (that is, off-chain funds of a first currency) in the HKD settlement account opened at the bank 1 by the bank 2. The bank 1 may further prompt the bank 3 as a receiving bank to deposit CNY corresponding to the remittance amount (that is, off-chain funds of a second currency) according to the agreed exchange rate in the CNY settlement account opened at the bank 3 by the bank 2.

In some embodiments, after the bank 1 deposits HKD corresponding to the remittance amount in the HKD settlement account opened at the bank 1 by the bank 2, the bank 1 may freeze the HKD funds, create an HKD on-chain balance on a blockchain using the frozen HKD funds as value support, and add the created HKD on-chain balance to a blockchain account of the bank 2 for holding. In some embodiments, the HKD on-chain balance created by the bank 1 may also be referred to as a first blockchain asset.

In some embodiments, after the bank 3 deposits CNY corresponding to the remittance amount in the CNY settlement account opened at the bank 3 by the bank 2, the bank 3 may freeze the CNY funds, create an CNY on-chain balance on the blockchain using the frozen CNY funds as value support, and add the created CNY on-chain balance to the blockchain account of the bank 2 for holding. In some embodiments, the CNY on-chain balance created by the bank 3 may also be referred to as a second blockchain asset.

In some embodiments, after the foregoing processes are completed, the bank 1 and the bank 3 may each send a fund exchange instruction to the bank 2. After determining that the fund exchange instructions from the bank 1 and the bank 3 are received, the bank 2 may create a fund exchange transaction according to the instructions, and then publish the asset exchange transaction to the blockchain.

In some embodiments, a node device in the blockchain may, in response to the asset exchange transaction, transfer the HKD on-chain balance held in the blockchain account corresponding to the bank 2 to a blockchain account corresponding to the bank 3, and transfer the CNY on-chain balance held in the blockchain account corresponding to the bank 2 to a blockchain account corresponding to the bank 1.

In some embodiments, after the node device in the blockchain completes the foregoing described asset exchange process, the bank 1 may further prompt the client 2 on whether to accept cross-currency remittance settlement based on the CNY on-chain balance. If the client 2 accepts cross-currency remittance settlement based on the CNY on-chain balance, the client 2 may send an instruction of performing cross-currency remittance settlement based on the CNY on-chain balance to the bank 1.

In some embodiments, after determining that the instruction, from the client 2, of performing cross-currency remittance settlement based on the CNY on-chain balance is received, the bank 1 may create a fund settlement transaction according to the instruction, and then publish the fund settlement transaction to the blockchain.

In some embodiments, the node device in the blockchain may transfer the CNY on-chain balance held in the blockchain account corresponding to the bank 2 to a blockchain account corresponding to the client 2 in real time in response to the fund settlement transaction, so as to convert the payment in HKD made by the client 1 into a payment in CNY according to the agreed exchange rate and remit the payment in CNY to the account of the client 2 in a cross-currency way. As a result, the system may reduce or avoid a relatively long fund delivery cycle caused by different system accounting time of the bank 1, the bank 2, and the bank 3 in cross-currency remittance settlement that directly uses off-chain funds. The effectiveness of the cross-currency remittance settlement can be significantly improved, and real-time settlement based on an on-chain balance can be implemented.

In some embodiments, if the client 2 does not accept cross-currency remittance settlement based on the on-chain balance, the bank 1 may initiate a conversion to the bank 3 to convert the CNY on-chain balance held in the blockchain account into off-chain CNY funds, and then transfer the converted CNY funds to the CNY settlement account opened at the bank 3 by the client 2.

Figure 7:
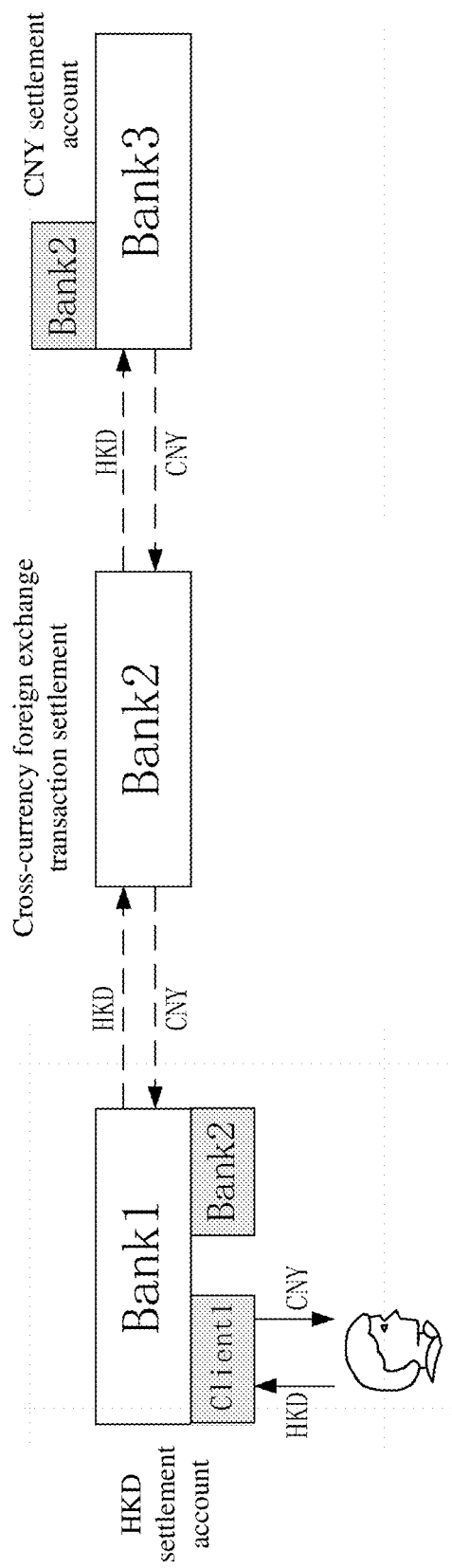
FIG. 7 is a schematic of an example cross-currency foreign exchange transaction settlement, according to some embodiments of this specification.

FIG. 7 is a schematic of an example cross-currency foreign exchange transaction settlement, according to some embodiments of this specification.

As shown in FIG. 7, a bank 1 is a Hong Kong branch or headquarter of a multinational bank. In some embodiments, the bank 1 can be one of the main settlement banks for HKD. A bank 3 is a branch or a headquarter of a Chinese-funded bank in Mainland China. In some embodiments, the bank 3 is one of the main settlement banks for CNY. The bank 1 and the bank 3 may open foreign exchange transaction accounts between each other. If the bank 1 and the bank 3 do not accept counterparty risks of each other, nostro/vostro accounts may not be opened between each other to deposit any assets.

As shown in FIG. 7, a client 1 opens HKD and CNY settlement accounts at the bank 1 and deposits funds of corresponding currencies of the client 1 in the accounts. A bank 2 shown in FIG. 7 is a China branch of the bank 1 and serves as an intermediary bank in cross-currency foreign exchange transaction settlement between the bank 1 and the bank 3.

In some embodiments, the bank 2 and the bank 1 accept counterparty risks of each other. As a result, the bank 2 can open an HKD nostro/vostro account at the bank 1 and deposit an HKD asset. In some embodiments, the HKD nostro/vostro account opened at bank 1 by the bank 2 can also be referred to as a first settlement account.

In some embodiments, the bank 2 and the bank 3 accept counterparty risks of each other. As a result, the bank 2 can open a CNY nostro/vostro account at the bank 3 and deposit a CNY asset. In some embodiments, the CNY nostro/vostro account opened at the bank 3 by the bank 2 can also be referred to as a second settlement account.

In some embodiments, in a cross-currency foreign exchange transaction settlement, it is assumed that the client 1 makes, through the bank 1, a foreign exchange transaction of selling HKD and buying CNY. The delivery of the foreign exchange transaction requires the client 1 to first deposit sufficient HKD funds in an HKD settlement account opened at the bank 1 as a reserve account by the client 1, and then the bank 1 delivers equivalent CNY funds according to an agreed exchange rate to a CNY reserve account opened at the bank 1 by the client 1.

In some embodiments, if the bank 1 does not have sufficient CNY funds to be delivered to the client 1, the bank 1 needs to make a foreign exchange transaction, through the bank 3, of selling HKD and buying CNY. The delivery of the foreign exchange transaction requires the bank 1 to pay a corresponding amount of HKD to the bank 3, and requires the bank 3 to pay a corresponding amount of CNY to the bank 1.

In this scenario, when the client 1 deposits sufficient HKD funds in the HKD settlement account opened at the bank 1 and the bank 1 delivers equivalent CNY funds according to an agreed exchange rate to the client 1, assuming that the bank 1 does not have sufficient CNY funds to be delivered to the client 1, the bank 1 may deposit a sufficient amount of HKD corresponding to the amount of to-be-delivered CNY (that is, off-chain funds of a first currency) in the HKD settlement account opened at the bank 1 by the bank 2. Correspondingly, the bank 1 may further prompt the bank 3 as a receiving bank to deposit CNY corresponding to the amount of to-be-delivered CNY (that is, off-chain funds of a second currency) according to the agreed exchange rate in the CNY settlement account opened at the bank 3 by the bank 2.

In some embodiments, after the bank 1 deposits HKD corresponding to the amount of to-be-delivered CNY in the HKD settlement account opened at the bank 1 by the bank 2, the bank 1 may freeze the deposited HKD funds, create an HKD on-chain balance (that is, a first blockchain asset) on a blockchain using the frozen HKD funds as value support, and add the created HKD on-chain balance to a blockchain account of the bank 2 for holding. The specific process of creating the HKD on-chain balance is not described herein.

In some embodiments, after the bank 3 deposits CNY corresponding to the amount of to-be-delivered CNY in the CNY settlement account opened at the bank 3 by the bank 2, the bank 3 may also freeze the CNY funds, create a CNY on-chain balance (that is, a second blockchain asset) on the blockchain using the frozen CNY funds as value support, and add the created CNY on-chain balance to the blockchain account of the bank 2 for holding. The specific process of creating the CNY on-chain balance is not described herein.

In some embodiments, after the foregoing processes are completed, the bank 1 and the bank 3 may each send a fund exchange instruction to the bank 2. After determining that the fund exchange instructions from the bank 1 and the bank 3 are received, the bank 2 may create a fund exchange transaction according to the instructions, and then publish the asset exchange transaction to the blockchain.

A node device in the blockchain may, in response to the asset exchange transaction, transfer the HKD on-chain balance held in the blockchain account corresponding to the bank 2 to a blockchain account corresponding to the bank 3 and transfer the CNY on-chain balance held in the blockchain account corresponding to the bank 2 to a blockchain account corresponding to the bank 1.

In some embodiments, after the node device in the blockchain completes the foregoing described asset exchange process, the bank 1 may further prompt the client 1 whether to accept cross-currency foreign exchange delivery settlement based on the CNY on-chain balance. If the client 1 accepts cross-currency foreign exchange delivery settlement based on the CNY on-chain balance, the client 1 may send an instruction of performing cross-currency foreign exchange delivery settlement based on the CNY on-chain balance to the bank 1.

In some embodiments, after determining that the instruction, from the client 2, of performing cross-currency foreign exchange delivery settlement based on the CNY on-chain balance is received, the bank 1 may create a fund settlement transaction according to the instruction, and then publish the fund settlement transaction to the blockchain.

The node device in the blockchain may transfer the CNY on-chain balance held in the blockchain account corresponding to the bank 2 to a blockchain account corresponding to the client 1 in real time in response to the fund settlement transaction, so as to complete the foreign exchange delivery settlement for a user.

In this way, issues with a relatively long fund delivery cycle caused by different system accounting time of the bank 1, the bank 2, and the bank 3 in cross-currency foreign exchange transaction settlements that directly uses off-chain funds can be reduced or avoided. The effectiveness of the cross-currency foreign exchange transaction settlement can be significantly improved, and real-time settlement based on an on-chain balance can be implemented.

In some embodiments, if the client 1 does not accept cross-currency foreign exchange delivery settlement based on the CNY on-chain balance, the bank 1 may initiate a conversion to the bank 3 to convert the CNY on-chain balance held in the blockchain account into off-chain CNY funds, and then transfer the converted CNY funds to the CNY settlement account opened at the bank 1 by the client 1. The specific process of converting the CNY on-chain balance into the off-chain CNY funds is not described herein.

Embodiments of this specification further provide blockchain-based cross-currency settlement apparatuses. In some embodiments, the blockchain-based cross-currency settlement apparatuses in this specification are applicable to electronic devices. In some embodiments, the apparatuses may be implemented using software, hardware, or a combination of software and hardware. Using a software implementation as an example, as a logical apparatus, the apparatus can be formed by reading corresponding computer program instructions from a non-volatile memory into an internal memory by a processor of an electronic device where the apparatus is located.

Figure 8:
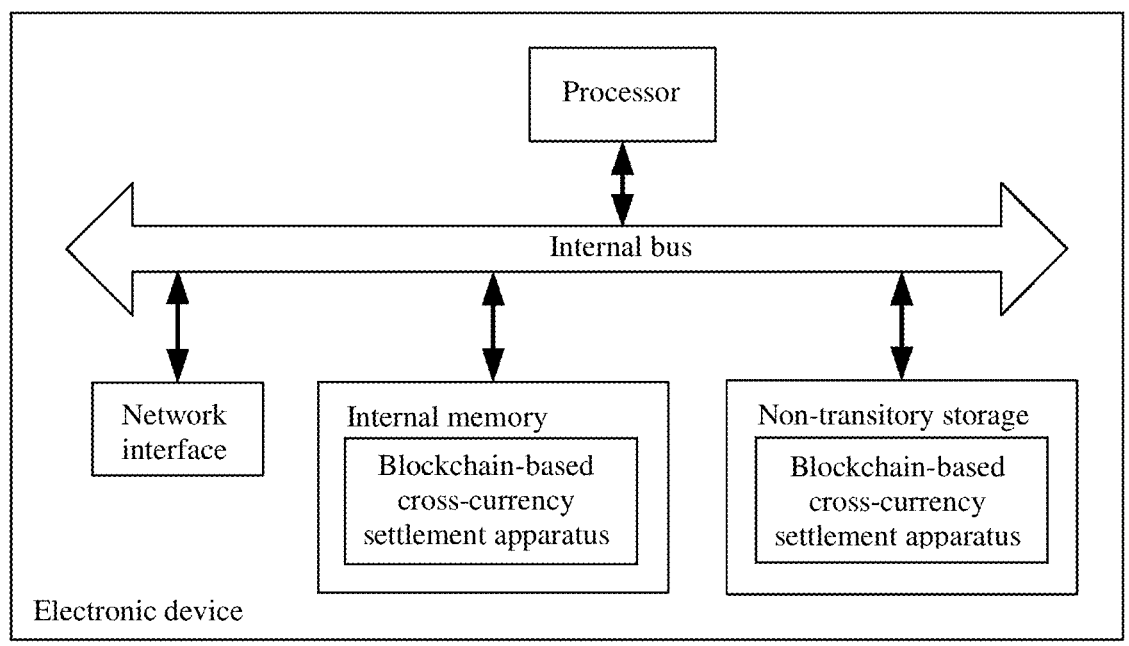
FIG. 8 is a schematic of an example electronic device, according to some embodiments of this specification.

FIG. 8 is a schematic of an example electronic device, according to some embodiments of this specification. As shown in FIG. 8, a blockchain-based cross-currency settlement apparatus is located in an electronic device. In some embodiments, the electronic device can include a processor, a memory, a network interface, and a non-transitory storage. In some embodiments, the electronic device may also include other hardware according to actual functions of the electronic device, which is not detailed herein.

In some embodiments, the processor shown in FIG. 8 may be implemented in a manner of a general central processing unit (CPU), a microprocessor, an application-specific integrated circuit (ASIC), or one or more integrated circuits, and is configured to execute a related program to implement the technical solutions provided in the embodiments of this specification.

In some embodiments, the non-transitory storage shown in FIG. 8 may be implemented in a form of a read-only memory (ROM), a random access memory (RAM), a static storage device, or a dynamic storage device. The memory may store an operating system and another application program. When the technical solutions provided in the embodiments of this specification are implemented by means of software or firmware, related program code can be stored in the memory and can be executed by the processor.

In some embodiments, the network interface shown in FIG. 8 can be configured to connect to a communication module (not shown in the figure) and to implement communication interaction between the device and another device. The communication module may implement communication in a wired manner (such as a USB and a network cable), or may implement communication in a wireless manner (such as a mobile network, WiFi, and Bluetooth).

In some embodiments, the internal bus shown in FIG. 8 can include a path for transmitting information between the components (for example, the processor, the internal memory, the non-transitory storage, and the network interface) of the electronic device.

Figure 9:
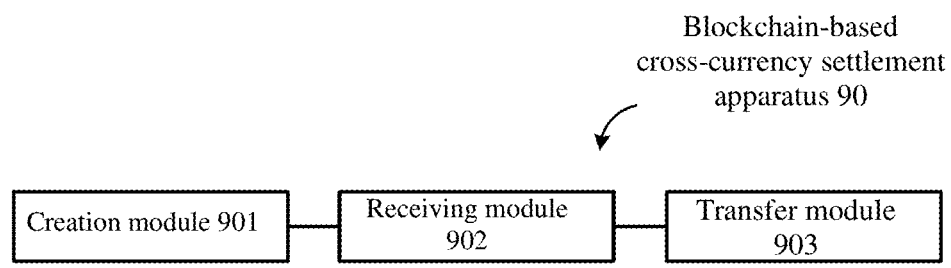
FIG. 9 is a schematic of an example blockchain-based settlement apparatus, according to some embodiments of this specification.

FIG. 9 is a schematic of an example blockchain-based cross-currency settlement apparatus, according to some embodiments of this specification. In some embodiments, a blockchain-based cross-currency settlement apparatus 90 shown in FIG. 9 is applicable to a node device in a blockchain based on which a settlement system shown in FIG. 4 is built. In some embodiments, the node device has a hardware structure similar to the electronic device shown in FIG. 8. The settlement system can include a first settlement node inside a territory, a transit node, and a second settlement node outside the territory. The transit node can be configured to open a first settlement account at the first settlement node, and open a second settlement account at the second settlement node. The apparatus 90 can include a creation module 901, a receiving module 902, and a transfer module 903.

The creation module 901 can be configured to create, for the transit node in response to a determination that off-chain funds of a first currency transferred by the first settlement node to the first settlement account are in a frozen state, a first blockchain asset corresponding to the off-chain funds of the first currency in the blockchain. The creation module 901 can be further configured to create, for the transit node in response to a determination that off-chain funds of a second currency transferred by the second settlement node to the second settlement account are in a frozen state, a second blockchain asset corresponding to the off-chain funds of the second currency in the blockchain for the transit node.

The receiving module 902 can be configured to receive a fund exchange transaction sent by the transit node. The fund exchange transaction can be a transaction created by the transit node according to fund exchange instructions from the first settlement node and the second settlement node.

The transfer module 903 can be configured to transfer the first blockchain asset from a blockchain account corresponding to the transit node to a blockchain account corresponding to the second settlement node and transfer the second blockchain asset from the blockchain account corresponding to the transit node to a blockchain account corresponding to the first settlement node in response to the fund exchange transaction, for the first settlement node or the second settlement node to perform cross-currency fund settlement for a user based on the blockchain asset transferred to the respective blockchain account.

In some embodiments, the creation module 901 is further configured to receive an asset creation transaction sent by the first settlement node. The asset creation transaction includes a freeze credential of the off-chain funds of the first currency transferred by the first settlement node to the first settlement account.

In some embodiments, the creation module 901 is further configured to call an asset creation logic in a smart contract published in the blockchain in response to the asset creation transaction, to create the first blockchain asset corresponding to the off-chain funds of the first currency in the blockchain for the transit node based on the freeze credential, and add the created first blockchain asset to the blockchain account corresponding to the transit node for holding.

In some embodiments, the creation module 901 is further configured to receive an asset creation transaction sent by the second settlement node. The asset creation transaction can include a freeze credential of the off-chain funds of the second currency transferred by the second settlement node to the second settlement account In some embodiments, the creation module 901 is configured to call an asset creation logic in a smart contract published in the blockchain in response to the asset creation transaction, to create the second blockchain asset corresponding to the off-chain funds of the second currency in the blockchain for the transit node based on the freeze credential, and add the created second blockchain asset to the blockchain account corresponding to the transit node for holding.

In some embodiments, the transfer module 903 is configured to call an asset exchange logic in a smart contract published in the blockchain in response to the fund exchange transaction, to transfer the first blockchain asset held in the blockchain account corresponding to the transit node to the blockchain account corresponding to the second settlement node, and transfer the second blockchain asset held in the blockchain account corresponding to the transit node to the blockchain account corresponding to the first settlement node.

In some embodiments, the transfer module is further configured to receive a fund settlement transaction sent by the first settlement node or the second settlement node. The fund settlement transaction can be a transaction created by the first settlement node or the second settlement node according to an instruction, sent by the user, of performing cross-currency fund settlement according to a blockchain asset. In some embodiments, the transfer module is configured to call an asset settlement logic in a smart contract published in the blockchain in response to the fund settlement transaction, to further transfer the blockchain asset held in the blockchain account corresponding to the first settlement node or the second settlement node to a blockchain account of the user for holding in order to complete the cross-currency fund settlement.

In some embodiments, the apparatus further includes a conversion module 904 (not shown in FIG. 9) configured to receive a fund conversion transaction sent by the first settlement node or the second settlement node. The fund conversion transaction can be a transaction created according to an instruction, sent by the user, of performing cross-currency fund settlement based on off-chain funds. In some embodiments, the fund conversion transaction is configured to call an asset conversion logic in a smart contract published in the blockchain in response to the fund conversion transaction, to mark the blockchain asset held in the blockchain account corresponding to the first settlement node or the second settlement node in a deregistered state, for a settlement node at a peer end of the first settlement node or the second settlement node to unfreeze off-chain funds corresponding to the blockchain asset in response to a determination that the blockchain asset is in a deregistered state, and transfer the unfrozen off-chain funds to a settlement account opened at the first settlement node or the second settlement node by the user.

In some embodiments, the conversion module is further configured to: receive a fund conversion transaction sent by a user client, where the fund conversion transaction is a transaction created by the client according to an instruction, sent by the user, of converting a held blockchain asset. In some embodiments, the conversion module is further configured to call the asset conversion logic in the smart contract published in the blockchain in response to the fund conversion transaction, to mark a blockchain asset held in a blockchain account of the user in a deregistered state, for the first settlement node or the second settlement node to unfreeze off-chain funds corresponding to the blockchain asset in response to a determination that the blockchain asset held in the blockchain account of the user is in a deregistered state, and transfer the unfrozen off-chain funds to the settlement account opened at the first settlement node or the second settlement node by the user.

In some embodiments, the settlement node is a bank, the transit node is an intermediary bank, and the first settlement account and the second settlement account are nostro/vostro accounts.

In some embodiments, the transit node is a branch bank node of the first settlement node in a territory in which the second settlement node is located, or the transit node is a branch bank node of the second settlement node in the territory in which the first settlement node is located.

In some embodiments, the settlement node is a bank, the transit node is a non-bank institution, and the first settlement account and the second settlement account are client reserve accounts opened at bank nodes by the non-bank institution.

In some embodiments, the user is a non-bank institution opening a client reserve account at the first settlement node or the second settlement node.

In some embodiments, the non-bank institution is a third-party payment institution.

In some embodiments, the non-bank institution is an issuing institution of a stored value instrument.

In some embodiments, the cross-currency fund settlement includes cross-currency remittance settlement.

In some embodiments, the cross-currency fund settlement includes cross-currency foreign exchange transaction settlement.

In some embodiments, the blockchain asset includes an on-chain balance issued on the blockchain based on frozen off-chain funds.

The system, the apparatus, the module, or the unit described in the foregoing embodiments may be implemented by a computer chip or an entity, or implemented by a product having a certain function. One implementation device is a computer. A specific form of the computer may be a personal computer, a laptop computer, a cellular phone, a camera phone, a smartphone, a personal digital assistant, a media player, a navigation device, an email transceiver device, a game console, a tablet computer, a wearable device, or a combination of any devices of these devices.

In some embodiments, the computer includes one or more processors (such as CPUs), an input/output interface, a network interface, and a memory.

In some embodiments, the memory may include a form such as a volatile memory, a random access memory (RAM) and/or a non-volatile memory such as a read-only memory (ROM) or a flash RAM in a computer-readable medium. The memory is an example of the computer readable medium.

In some embodiments, the computer-readable medium includes a volatile medium and a non-volatile medium, a removable medium and a non-removable medium, which may implement storage of information by using any method or technology. The information may be a computer-readable instruction, a data structure, a module of a program, or other data. Examples of computer storage media include, but are not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computer device can access. Based on the definition in the present disclosure, the computer readable medium does not include transitory computer readable media (transitory media), such as a modulated data signal and a carrier. In some embodiments, the computer-readable storage medium can be a part of the memory non-transitory storage shown in FIG. 8, and the computer program stored in the computer-readable storage medium can be executed by the processor shown in FIG. 8.

It may be learned from description of the foregoing implementations that, a person skilled in the art may clearly understand that the embodiments of this specification may be implemented by using software in addition to a necessary universal hardware platform. Based on such an understanding, the technical solutions of the embodiments of this specification essentially or the part contributing to the existing technologies may be implemented in a form of a software product. The computer software product may be stored in a storage medium, such as a ROM/RAM, a hard disk, or an optical disc, and includes a plurality of instructions for instructing a computer device (which may be a personal computer, a server, or a network device) to perform the methods described in the embodiments or some parts of the embodiments of this specification.

The system, the method, the module or the unit described in the foregoing embodiments may be implemented by a computer chip or an entity, or implemented by a product having a certain function. A typical implementation device is a computer, and the specific form of the computer may be a personal computer, a laptop computer, a cellular telephone, a camera phone, a smartphone, a personal digital assistant, a media player, a navigation device, an email transceiver device, a game console, a tablet computer, a wearable device, or a combination thereof.

In the foregoing technical solutions, when cross-currency settlement nodes perform cross-currency settlement using a transit node, after the first settlement node and the second settlement node respectively transfer off-chain funds of different currencies to the settlement accounts opened at the first settlement node and the second settlement node by the transit node, the off-chain funds in the settlement accounts can be frozen, and blockchain assets corresponding to the frozen off-chain funds in the settlement accounts can be issued on the blockchain. Then a cross-currency fund exchange is completed based on the blockchain assets issued on the blockchain without directly using the off-chain funds. Therefore, a problem of a relatively long fund delivery cycle caused by different system accounting time of bank nodes and the transit node in a cross-currency fund exchange that directly uses off-chain funds can be reduced or avoided, and the effectiveness of the cross-currency fund exchange can be significantly improved when implementing real-time settlement based on a blockchain asset.

In this specification, the embodiments are described in a progressive manner Reference may be made to each other for the same or a similar part of the embodiments. Each embodiment focuses on a difference from other embodiments. Especially, apparatus and device embodiments are basically similar to a method embodiment, and therefore are described briefly; for related parts, refer to partial descriptions in the method embodiment. The method embodiment described above is merely an example. The modules described as separate parts may or may not be physically separate. During implementation of the solutions of the embodiments of this specification, the function of the modules may be implemented in the same piece of or a plurality of pieces of software and/or hardware. A part or all of the modules may be selected according to actual needs to achieve the objectives of the solutions of the embodiments. A person of ordinary skill in the art may understand and implement this specification without creative efforts.

The terms used in one or more embodiments of this specification are merely used to describe the embodiments but are not intended to limit one or more embodiments of this specification. The "a" and "the" in a singular form used in one or more embodiments of this specification and the appended claims are also intended to include a plural form, unless other meanings are clearly indicated in the context. It should be further understood that the term "and/or" used herein indicates and includes any or all possible combinations of one or more associated listed items.

It should be understood that although the terms "first," "second," "third," and the like may be used to describe various information in one or more embodiments of this specification, such information should not be limited to these terms. These terms are merely used to distinguish between information of the same type. For example, without departing from the scope of one or more embodiments of this specification, first information may also be referred to as second information. Similarly, second information may also be referred to as first information. Depending on the context, for example, the word "if" used herein may be interpreted as "while" or "when," or "in response to determination."

The foregoing descriptions are merely specific implementations of the embodiments of this specification. A person of ordinary skill in the art may make several improvements and modifications without departing from the principle of the embodiments of this specification and the improvements and modifications shall fall within the protection scope of the embodiments of this specification.

What is claimed is:

1. A method for blockchain-based cross-currency settlement performed by a blockchain network, comprising:
    compiling a high-level language of a smart contract to generate bytecode of the smart contract, wherein the bytecode is deployable on the blockchain network;
    publishing the smart contract on the blockchain network to deploy the bytecode of the smart contract on the blockchain network;
    in response to a determination that first off-chain funds of a first currency transferred by a first settlement node to a first settlement account are in a frozen state, adding a first blockchain asset corresponding to the first off-chain funds of the first currency to a blockchain account of a transit node in the blockchain network, wherein the first settlement node is inside a territory and the first settlement account is opened by the transit node at the first settlement node, and the adding the first blockchain asset to the blockchain account of the transit node comprises:
        receiving an asset creation transaction from the first settlement node, the asset creation transaction comprising a freeze credential of the first off-chain funds of the first currency, and
        in response to receiving the asset creation transaction sent by the first settlement node:
            calling an asset creation logic in the bytecode of the smart contract published in the blockchain to create the first blockchain asset based on the freeze credential, and adding the created first blockchain asset to the blockchain account corresponding to the transit node;

in response to a determination that second off-chain funds of a second currency different from the first currency transferred by a second settlement node to a second settlement account are in a frozen state, adding a second blockchain asset corresponding to the second off-chain funds of the second currency to the blockchain account of the transit node in the blockchain network, wherein the second settlement node is outside the territory and the second settlement account is opened by the transit node at the second settlement node;

receiving a fund exchange transaction sent by the transit node, the fund exchange transaction created by the transit node according to fund exchange instructions from the first settlement node and the second settlement node; and in response to receiving the fund exchange transaction:
transferring the first blockchain asset from a blockchain account corresponding to the transit node to a blockchain account corresponding to the second settlement node, and
transferring the second blockchain asset from the blockchain account corresponding to the transit node to a blockchain account corresponding to the first settlement node to perform, by the first settlement node or the second settlement node, cross-currency fund settlement.

2. The method according to claim 1, wherein adding the second blockchain asset to the blockchain account of the transit node comprises:

receiving an asset creation transaction sent by the second settlement node, wherein the asset creation transaction comprises a freeze credential of the off-chain funds of the second currency; and in response to receiving the asset creation transaction sent by the second settlement node:
calling the asset creation logic in the bytecode of the smart contract published in the blockchain to create the second blockchain asset based on the freeze credential, and
adding the created second blockchain asset to the blockchain account corresponding to the transit node for holding.

3. The method according to claim 1, wherein:

transferring the first blockchain asset from the blockchain account corresponding to the transit node to the blockchain account corresponding to the second settlement node comprises: calling an asset exchange logic in the bytecode of the smart contract published in the blockchain to transfer the first blockchain asset held in the blockchain account corresponding to the transit node to the blockchain account corresponding to the second settlement node; and transferring the second blockchain asset from the blockchain account corresponding to the transit node to the blockchain account corresponding to the first settlement node comprises: calling the asset exchange logic in the bytecode of the smart contract published in the blockchain to transfer the second blockchain asset held in the blockchain account corresponding to the transit node to the blockchain account corresponding to the first settlement node.

4. The method according to claim 1, further comprising:
receiving a fund settlement transaction sent by the first settlement node or the second settlement node, wherein the fund settlement transaction is created by the first settlement node or the second settlement node according to an instruction sent by a client device of a user to perform cross-currency fund settlement; and in response to the fund settlement transaction, calling an asset settlement logic in the bytecode of the smart contract published in the blockchain to transfer the second blockchain asset held in the blockchain account corresponding to the first settlement node or the first blockchain asset held in the blockchain account corresponding to the second settlement node to a blockchain account of the user for holding.

5. The method according to claim 1, further comprising:
receiving a fund conversion transaction sent by the first settlement node or the second settlement node, wherein the fund conversion transaction is created according to an instruction sent by a client device of a user to perform cross-currency fund settlement based on off-chain funds;

in response to receiving the fund conversion transaction, calling an asset conversion logic in the bytecode of the smart contract published in the blockchain to mark the second blockchain asset held in the blockchain account corresponding to the first settlement node in a deregistered state; and in response to determining that the second blockchain asset held in the blockchain account corresponding to the first settlement node or the first blockchain asset held in the blockchain account corresponding to the second settlement node is in the deregistered state:
unfreezing, by a settlement node at a peer end of the first settlement node or the second settlement node, the second off-chain funds corresponding to the second blockchain asset or the first off-chain funds corresponding to the first blockchain asset, and
transferring, by the first settlement node or the second settlement node, the unfrozen second off-chain funds or the unfrozen first off-chain funds to a settlement account opened at the first settlement node or the second settlement node by the user.

6. The method according to claim 5, further comprising:
receiving an asset conversion transaction sent by the client device of the user, wherein the asset conversion transaction is a transaction created by the client device according to an instruction, sent by the user to convert a held blockchain asset; and in response to the asset conversion transaction, calling the asset conversion logic in the bytecode of the smart contract published in the blockchain to mark a blockchain asset held in a blockchain account of the user in a deregistered state; and in response to determining that the blockchain asset held in the blockchain account of the user is in the deregistered state:
unfreezing, by the first settlement node or the second settlement node, off-chain funds corresponding to the blockchain asset, and
transferring, by the first settlement node or the second settlement node, the unfrozen off-chain funds to the settlement account opened at the first settlement node or the second settlement node by the user.

7. The method according to claim 1, wherein the first settlement node and the second settlement node are banks, and the first settlement account and the second settlement account are nostro/vostro accounts.

8. The method according to claim 7, wherein the transit node is a branch bank node of the first settlement node in a territory in which the second settlement node is located, or the transit node is a branch bank node of the second settlement node in the territory in which the first settlement node is located.

9. The method according to claim 1, wherein the first settlement node and the second settlement node are banks, the transit node is a non-bank institution, and the first settlement account and the second settlement account are client reserve accounts opened at the banks by the non-bank institution.

10. The method according to claim 5, wherein the user is a non-bank institution opening a client reserve account at the first settlement node or the second settlement node.

11. The method according to claim 10, wherein the non-bank institution is a third-party payment institution.

12. The method according to claim 10, wherein the non-bank institution is an issuing institution of a stored value instrument.

13. The method according to claim 1, wherein the cross-currency fund settlement comprises cross-currency remittance settlement.

14. The method according to claim 1, wherein the cross-currency fund settlement comprises cross-currency foreign exchange transaction settlement.

15. The method according to claim 1, wherein the first blockchain asset comprises an on-chain balance issued on the blockchain based on the first frozen off-chain funds and the second blockchain asset comprises an on-chain balance issued on the blockchain based on the second frozen off-chain funds.

16. A system for blockchain-based cross-currency settlement, comprising one or more processors and one or more non-transitory computer-readable memories coupled to the one or more processors and configured with instructions executable by the one or more processors to cause the system to perform operations comprising:
  compiling a high-level language of a smart contract to generate bytecode of the smart contract, wherein the bytecode is deployable on the blockchain network;
  publishing the smart contract on the blockchain network to deploy the bytecode of the smart contract on the blockchain network;
  in response to a determination that first off-chain funds of a first currency transferred by a first settlement node to a first settlement account are in a frozen state, adding a first blockchain asset corresponding to the first off-chain funds of the first currency to a blockchain account of a transit node in a blockchain network, wherein the first settlement node is inside a territory and the first settlement account is opened by the transit node at the first settlement node, and the adding the first blockchain asset to the blockchain account of the transit node comprises:
    receiving an asset creation transaction from the first settlement node, the asset creation transaction comprising a freeze credential of the first off-chain funds of the first currency, and
    in response to receiving the asset creation transaction sent by the first settlement node:
      calling an asset creation logic in the bytecode of the smart contract published in the blockchain to create the first blockchain asset based on the freeze credential, and
      adding the created first blockchain asset to the blockchain account corresponding to the transit node;
  in response to a determination that second off-chain funds of a second currency different from the first currency transferred by a second settlement node to a second settlement account are in a frozen state, adding a second blockchain asset corresponding to the second off-chain funds of the second currency to the blockchain account of the transit node in the blockchain network, wherein the second settlement node is outside the territory and the second settlement account is opened by the transit node at the second settlement node;
  receiving a fund exchange transaction sent by the transit node, the fund exchange transaction created by the transit node according to fund exchange instructions from the first settlement node and the second settlement node; and
  in response to receiving the fund exchange transaction:
    transferring the first blockchain asset from a blockchain account corresponding to the transit node to a blockchain account corresponding to the second settlement node, and
    transferring the second blockchain asset from the blockchain account corresponding to the transit node to a blockchain account corresponding to the first settlement node to perform, by the first settlement node or the second settlement node, cross-currency fund settlement.

17. The system according to claim 16, wherein the operations further comprise:
  receiving a fund conversion transaction sent by the first settlement node or the second settlement node, wherein the fund conversion transaction is created according to an instruction, sent by a client device of a user to perform cross-currency fund settlement based on off-chain funds;
  in response to receiving the fund conversion transaction, calling an asset conversion logic in the bytecode of the smart contract published in the blockchain to mark the second blockchain asset held in the blockchain account corresponding to the first settlement node in a deregistered state; and
  in response to determining that the second blockchain asset held in the blockchain account corresponding to the first settlement node or the first blockchain asset held in the blockchain account corresponding to the second settlement node is in the deregistered state:
    unfreezing, by a settlement node at a peer end of the first settlement node or the second settlement node, the second off-chain funds corresponding to the second blockchain asset or the first off-chain funds corresponding to the first blockchain asset, and
    transferring, by the first settlement node or the second settlement node, the unfrozen second off-chain funds or the unfrozen first off-chain funds to a settlement account opened at the first settlement node or the second settlement node by the user.

18. One or more non-transitory computer-readable storage media storing instructions for blockchain-based cross-currency settlements, wherein the instructions are executable by one or more processors and execution of the instructions causes the one or more processors to perform operations comprising:
  compiling a high-level language of a smart contract to generate bytecode of the smart contract, wherein the bytecode is deployable on the blockchain network;
  publishing the smart contract on the blockchain network to deploy the bytecode of the smart contract on the blockchain network;

in response to a determination that first off-chain funds of a first currency transferred by a first settlement node to a first settlement account are in a frozen state, adding a first blockchain asset corresponding to the first off-chain funds of the first currency to a blockchain account of a transit node in the blockchain network, wherein the first settlement node is inside a territory and the first settlement account is opened by the transit node at the first settlement node;

in response to a determination that second off-chain funds of a second currency different from the first currency transferred by a second settlement node to a second settlement account are in a frozen state, adding a second blockchain asset corresponding to the second off-chain funds of the second currency to the blockchain account of the transit node in the blockchain network, wherein the second settlement node is outside the territory and the second settlement account is opened by the transit node at the second settlement node, and the adding the first blockchain asset to the blockchain account of the transit node comprises:

receiving an asset creation transaction from the first settlement node, the asset creation transaction comprising a freeze credential of the first off-chain funds of the first currency, and in response to receiving the asset creation transaction sent by the first settlement node:

calling an asset creation logic in the bytecode of the smart contract published in the blockchain to create the first blockchain asset based on the freeze credential, and adding the created first blockchain asset to the blockchain account corresponding to the transit node;

receiving a fund exchange transaction sent by the transit node, the fund exchange transaction created by the transit node according to fund exchange instructions from the first settlement node and the second settlement node; and in response to receiving the fund exchange transaction:

transferring the first blockchain asset from a blockchain account corresponding to the transit node to a blockchain account corresponding to the second settlement node, and transferring the second blockchain asset from the blockchain account corresponding to the transit node to a blockchain account corresponding to the first settlement node to perform, by the first settlement node or the second settlement node, cross-currency fund settlement.

19. The one or more non-transitory computer-readable storage media according to claim 18, wherein the operations further comprise:

receiving a fund conversion transaction sent by the first settlement node or the second settlement node, wherein the fund conversion transaction is created according to an instruction, sent by a client device of a user to perform cross-currency fund settlement based on off-chain funds;

in response to receiving the fund conversion transaction, calling an asset conversion logic in the bytecode of the smart contract published in the blockchain to mark the second blockchain asset held in the blockchain account corresponding to the first settlement node in a deregistered state; and in response to determining that the second blockchain asset held in the blockchain account corresponding to the first settlement node or the first blockchain asset held in the blockchain account corresponding to the second settlement node is in the deregistered state:

unfreezing, by a settlement node at a peer end of the first settlement node or the second settlement node, the second off-chain funds corresponding to the second blockchain asset or the first off-chain funds corresponding to the first blockchain asset, and transferring, by the first settlement node or the second settlement node, the unfrozen second off-chain funds or the unfrozen first off-chain funds to a settlement account opened at the first settlement node or the second settlement node by the user.

* * * * *

UNITED STATES PATENT AND TRADEMARK OFFICE
CERTIFICATE OF CORRECTION

| | | |
|---|---|---|
| PATENT NO. | : 11,354,744 B2 | |
| APPLICATION NO. | : 17/361366 | |
| DATED | : June 7, 2022 | |
| INVENTOR(S) | : Shi Shu et al. | |

It is certified that error appears in the above-identified patent and that said Letters Patent is hereby corrected as shown below:

On the Title Page

Item (71) Applicant's city "Zhejiang" should read -- Hangzhou --.

Signed and Sealed this
Thirtieth Day of August, 2022

Katherine Kelly Vidal
*Director of the United States Patent and Trademark Office*